US009900426B2

(12) United States Patent
Nagata et al.

(10) Patent No.: US 9,900,426 B2
(45) Date of Patent: Feb. 20, 2018

(54) ELECTRONIC APPARATUS, METHOD FOR CONTROLLING THE SAME AND PROCESSOR FOR THE SAME

(71) Applicant: KYOCERA Corporation, Kyoto-shi, Kyoto (JP)

(72) Inventors: Shunsuke Nagata, Higashiosaka (JP); Tomoki Iwaizumi, Osaka (JP)

(73) Assignee: KYOCERA Corporation, Kyoto (JP)

( * ) Notice: Subject to any disclaimer, the term of this patent is extended or adjusted under 35 U.S.C. 154(b) by 28 days.

(21) Appl. No.: 15/215,265

(22) Filed: Jul. 20, 2016

(65) Prior Publication Data
US 2017/0034340 A1 Feb. 2, 2017

(30) Foreign Application Priority Data
Jul. 29, 2015 (JP) ................................. 2015-149356

(51) Int. Cl.
*H04M 1/725* (2006.01)
*H04M 1/67* (2006.01)
*H04M 1/253* (2006.01)
*H04W 88/06* (2009.01)

(52) U.S. Cl.
CPC ...... *H04M 1/72583* (2013.01); *H04M 1/2535* (2013.01); *H04M 1/67* (2013.01); *H04W 88/06* (2013.01)

(58) Field of Classification Search
CPC .. H04M 1/2535; H04M 1/67; H04M 1/72583; H04W 88/06
See application file for complete search history.

(56) References Cited

U.S. PATENT DOCUMENTS

| 9,785,487 | B1* | 10/2017 | Liu | G06F 9/542 |
|---|---|---|---|---|
| 2006/0286984 | A1* | 12/2006 | Bonner | H04W 36/14 455/445 |
| 2008/0058883 | A1* | 3/2008 | Gautier | G06F 1/3203 607/29 |
| 2010/0142482 | A1* | 6/2010 | Lu | H04B 7/18506 370/331 |
| 2010/0255886 | A1* | 10/2010 | Shouji | H04M 1/72519 455/566 |
| 2013/0029731 | A1* | 1/2013 | Fuchigami | H04M 1/72577 455/566 |

(Continued)

FOREIGN PATENT DOCUMENTS

JP 2012-104894 A 5/2012

*Primary Examiner* — Lewis West
(74) *Attorney, Agent, or Firm* — Procopio Cory Hargreaves and Savitch LLP

(57) ABSTRACT

At least one processor executes (i) a first function of terminating communication via a first network, in response to a first input to an input unit, (ii) a second function of terminating communication via a second network, in response to a second input to the input unit, and (iii) a third function of terminating communication via the first and second networks, in response to a third input to the input unit. The at least one processor limits, when the at least one processor processes a first call via the first network, at least one of the first input and the first function and at least one of the third input and the third function, and limits, when the at least one processor processes a second call via the second network, at least one of the second input and the second function and at least one of the third input and the third function.

12 Claims, 16 Drawing Sheets

(56) References Cited

U.S. PATENT DOCUMENTS

| | | | |
|---|---|---|---|
| 2013/0244608 A1* | 9/2013 | Malik | H04W 4/22 |
| | | | 455/404.1 |
| 2014/0106699 A1* | 4/2014 | Chitre | H04W 76/007 |
| | | | 455/404.1 |
| 2015/0156308 A1* | 6/2015 | Jang | H04M 1/656 |
| | | | 455/411 |
| 2016/0198397 A1* | 7/2016 | Lee | H04W 48/16 |
| | | | 455/434 |
| 2017/0223597 A1* | 8/2017 | Telang | H04W 36/22 |

* cited by examiner

F I G. 1 0
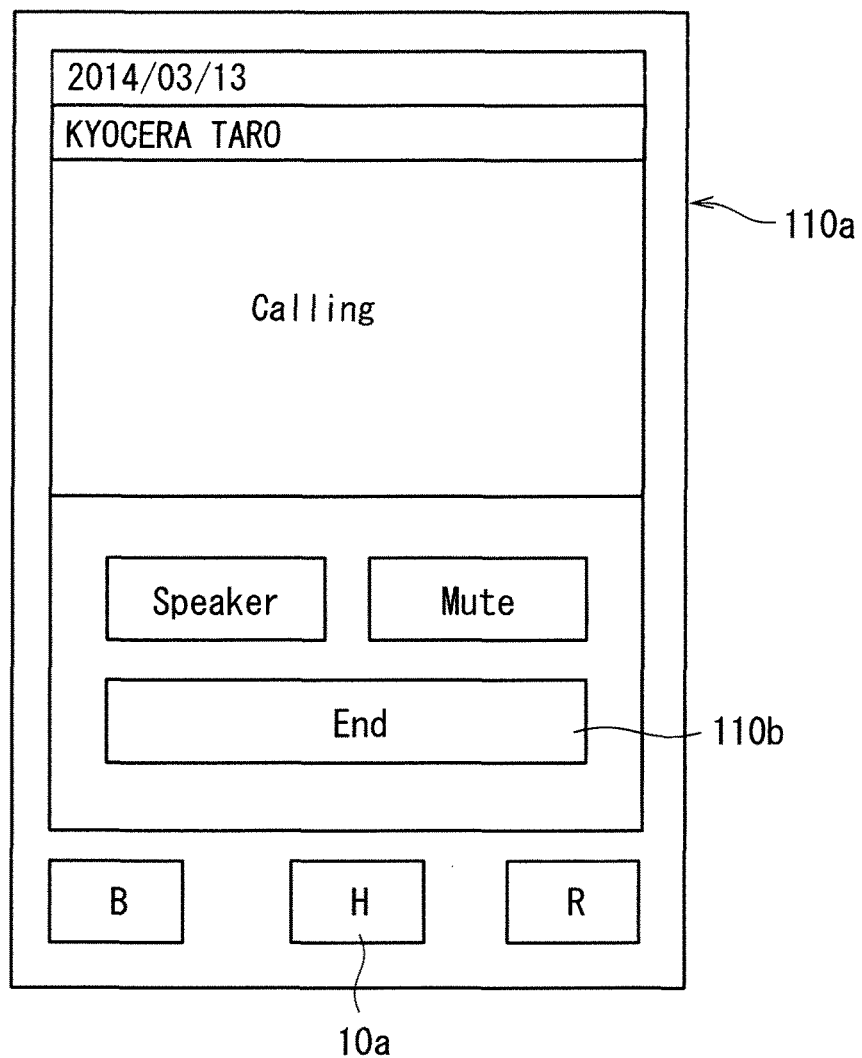

F I G. 1 1
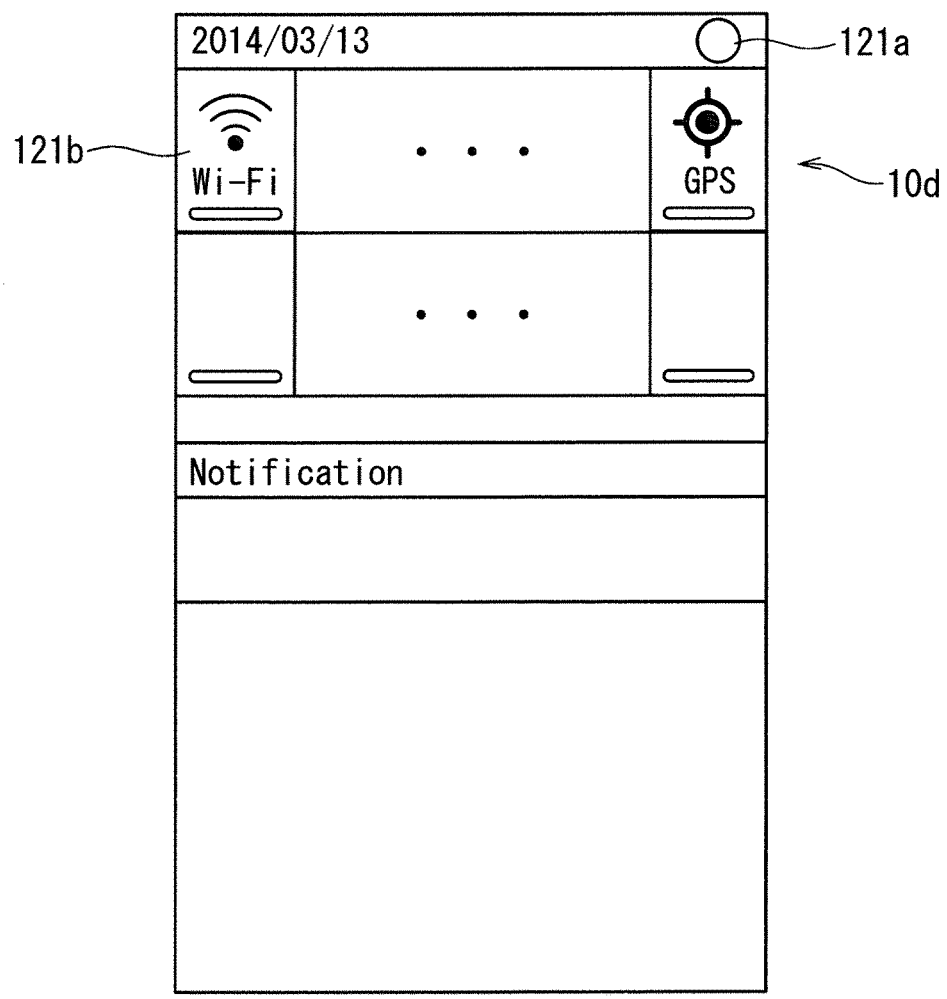

F I G. 1 2
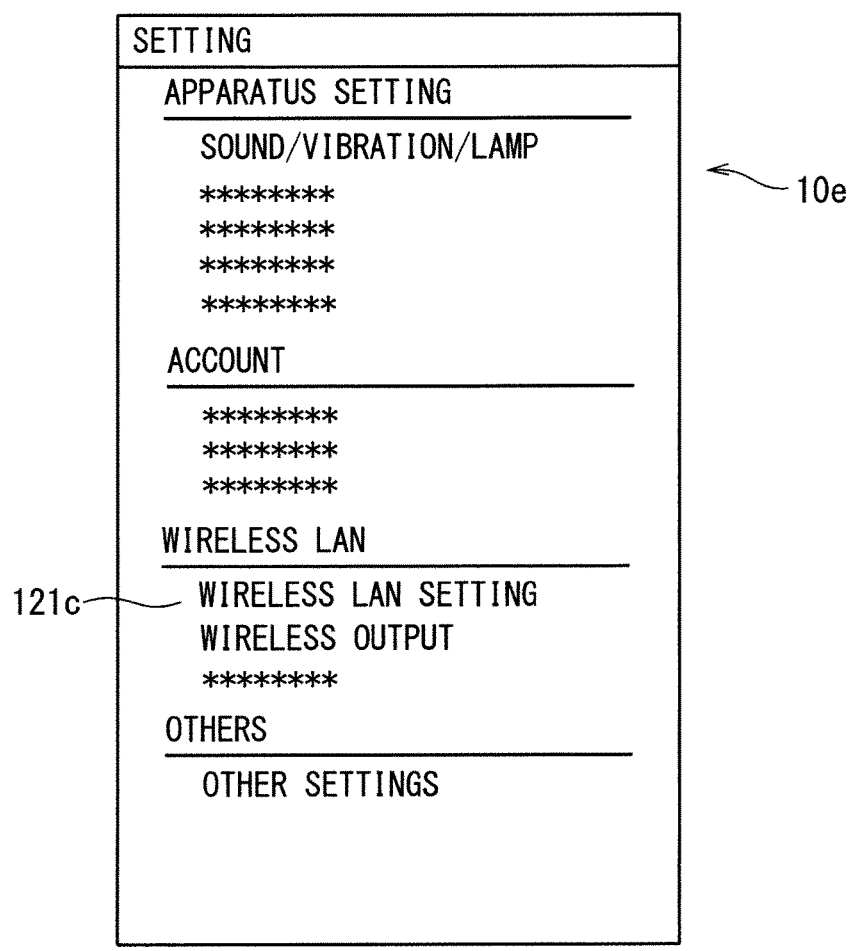

FIG. 13

| VOICE CALL | CHANGE IN SIM CARD<br>CHANGE IN NETWORK OPERATOR<br>CHANGE IN NETWORK TYPE<br>CHANGE IN USER<br>AIRPLANE MODE<br>INITIALIZATION<br>SYSTEM UPDATE<br>TURNING OFF POWER<br>REBOOT |
|---|---|
| COMMUNICATION CALL | TURNING OFF COMMUNICATION DATA<br>TURNING OFF LTE<br>CHANGE IN SIM CARD<br>CHANGE IN NETWORK OPERATOR<br>CHANGE IN NETWORK TYPE<br>CHANGE IN USER<br>AIRPLANE MODE<br>INITIALIZATION<br>SYSTEM UPDATE<br>TURNING OFF POWER<br>REBOOT |
| WIRELESS LAN CALL | TURNING OFF WIRELESS LAN<br>DISCONNECTION OF CONNECTED WIRELESS LAN<br>CONNECTION TO ANOTHER ACCESS POINT<br>CHANGE IN USER<br>AIRPLANE MODE<br>INITIALIZATION<br>SYSTEM UPDATE<br>TURNING OFF POWER<br>REBOOT |

F I G. 2 0
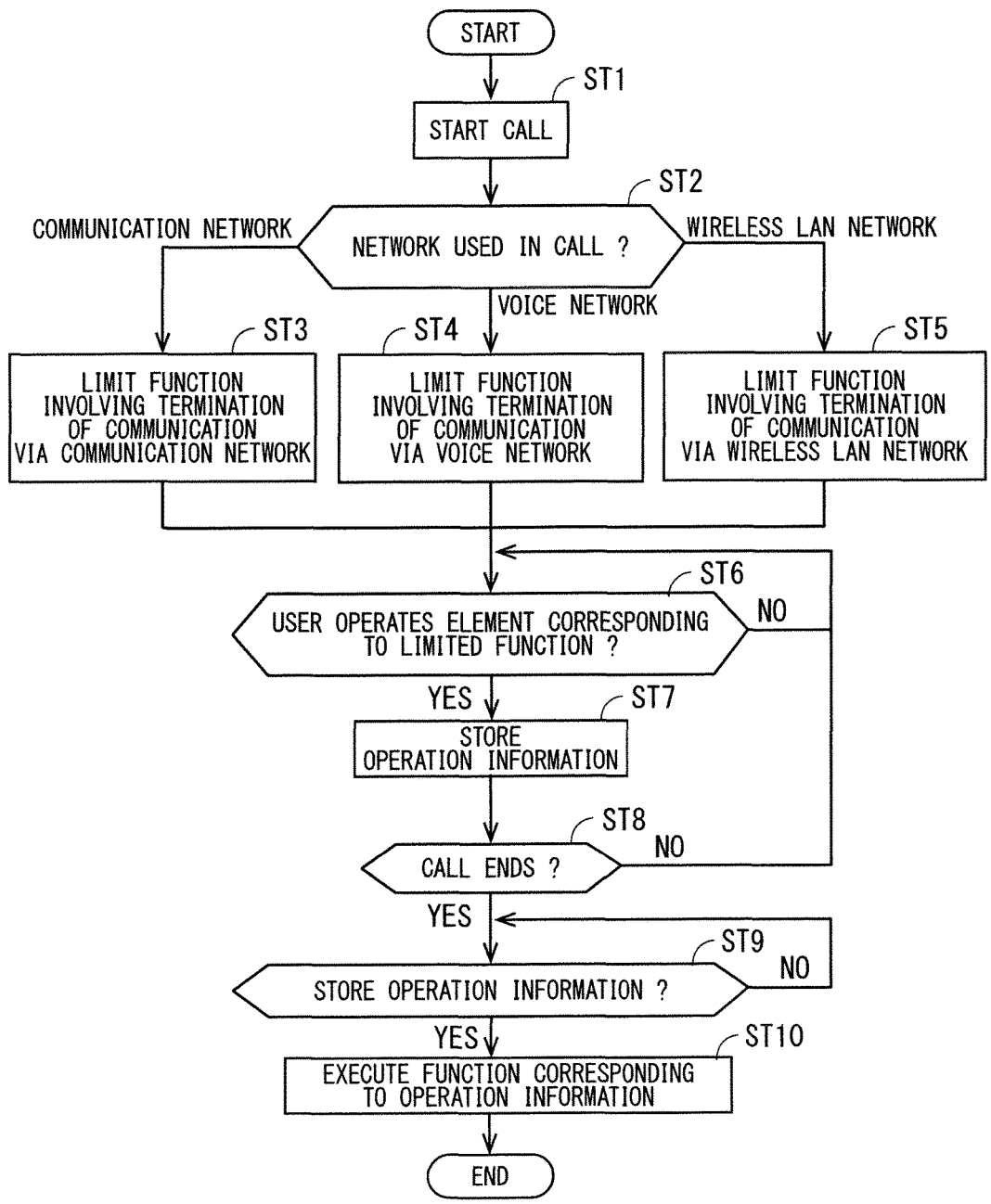

ELECTRONIC APPARATUS, METHOD FOR CONTROLLING THE SAME AND PROCESSOR FOR THE SAME

CROSS-REFERENCE TO RELATED APPLICATION

The present application claims priority under 35 U.S.C. § 119 to Japanese Patent Application No. 2015-149356, filed on Jul. 29, 2015, entitled "ELECTRONIC APPARATUS". The content of which is incorporated by reference herein in its entirety.

FIELD

Embodiments of the present disclosure relate to an electronic apparatus.

BACKGROUND

Mobile phones can communicate with another mobile phone via, for example, voice communication networks. Meanwhile, mobile phones that communicate with another mobile phone via, for example, Internet Protocol (IP) networks have been on the market in recent years. Moreover, mobile phones that communicate with another mobile phone via networks each using an access point of a wireless local area network (LAN) as a network window have also been on the market.

SUMMARY

An electronic apparatus, and a method for controlling the same and a processor for the same are disclosed. In one embodiment, the electronic apparatus comprises a communication unit, at least one processor, an input unit. The communication unit communicates with a plurality of networks. The at least one processor processes, through the communication unit, a first call via a first network and a second call via a second network different from the first network, the first network and the second network being included in the plurality of networks. The at least one processor executes (i) a first function of terminating communication via the first network, in response to a first input to the input unit, (ii) a second function of terminating communication via the second network, in response to a second input to the input unit, and (iii) a third function of terminating communication via the first and second networks, in response to a third input to the input unit. The at least one processor limits, when the at least one processor processes the first call, at least one of the first input and the first function and at least one of the third input and the third function, and limits, when the at least one processor processes the second call, at least one of the second input and the second function and at least one of the third input and the third function.

In one embodiment, an electronic apparatus includes a communication unit and an input unit. The communication unit communicates with a plurality of networks. A method for controlling the electronic apparatus comprises first to third processes. The first process is processing, through the communication unit, a first call via a first network and a second call via a second network different from the first network, the first network and the second network being included in the plurality of networks. The second process is executing (i) a first function of terminating communication via the first network, in response to a first input to the input unit, (ii) a second function of terminating communication via the second network, in response to a second input to the input unit, and (iii) a third function of terminating communication via the first and second networks, in response to a third input to the input unit. The third process is limiting, in processing the first call, at least one of the first input and the first function and at least one of the third input and the third function, and limiting, in processing the second call, at least one of the second input and the second function and at least one of the third input and the third function.

In one embodiment, an electronic apparatus includes a communication unit and an input unit. The communication unit communicates with a plurality of networks. A processor for the electronic apparatus comprises a call processor, a function processor, and a limiting processor. The call processor processes, through the communication unit, a first call via a first network and a second call via a second network different from the first network, the first network and the second network being included in the plurality of networks. The function processor executes (i) a first function of terminating communication via the first network, in response to a first input to the input unit, (ii) a second function of terminating communication via the second network, in response to a second input to the input unit, and (iii) a third function of terminating communication via the first and second networks, in response to a third input to the input unit. The limiting processor limits, when the call processor processes the first call, at least one of the first input and the first function and at least one of the third input and the third function, and limits, when the call processor processes the second call, at least one of the second input and the second function and at least one of the third input and the third function.

BRIEF DESCRIPTION OF THE DRAWINGS

FIG. 10 schematically illustrates an example of a call screen.

FIG. 11 schematically illustrates an example of a notification screen.

FIG. 12 schematically illustrates an example of a menu screen.

FIG. 13 illustrates a table showing an example of types of calls and their respective functions.

FIG. 20 schematically illustrates a flowchart showing an example of operations performed by the controller.

DETAILED DESCRIPTION

[Outline of Overall Structure]

Figure 1:
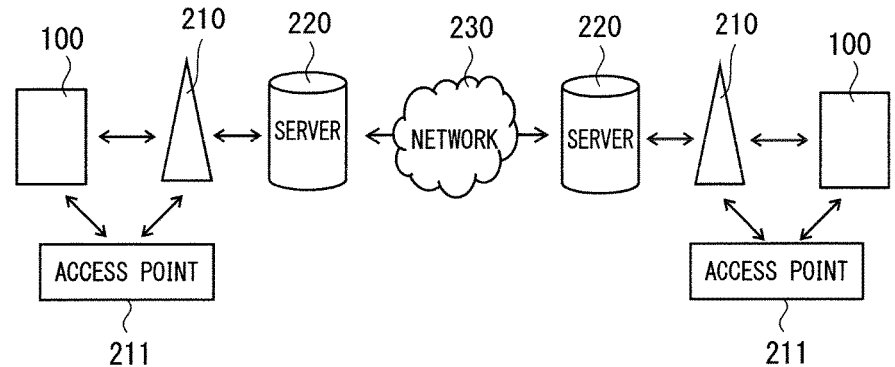
FIG. 1 schematically illustrates an example of a structure of a network system.

FIG. 1 schematically illustrates an example of a structure of a network system. This network system includes base stations 210, servers 220, and a network 230.

Electronic apparatuses 100 that are example call apparatuses can, for example, wirelessly, communicate with the base stations 210. The base stations 210 also communicate with the servers 220. The servers 220 transmit signals received from the base station 210 to the network 230, and signals received from the network 230 to the base stations 210.

In the network system, the electronic apparatuses 100 can communicate with another electronic apparatus via the base stations 210, the servers 220, and the network 230. For example, the electronic apparatuses 100 can transmit a signal to the other electronic apparatus via the first base station 210, the first server 220, the network 230, the second server 220, and the second base station 210, and receive a signal from the other electronic apparatus in an opposite order to the transmission order.

Furthermore, the electronic apparatuses 100 can communicate with the base stations 210 in accordance with telecommunications standards. Examples of the telecommunications standards in mobile telecommunications include the first generation (1G) to the fourth generation (4G) of telecommunications standards. Each of the base stations 210 complies with at least one of these generations of telecommunications standards. Herein, 3G and 4G are mainly used. Examples of 4G include the Long-Term Evolution (LTE). The network system herein may include, for example, the base stations 210 that comply with 3G, and the base stations 210 that comply with both 3G and 4G.

It is expected that additional telecommunications standards will appear with each passing generation. Such telecommunications standards may also be used herein.

Furthermore, examples of wireless telecommunications standards include wireless LAN standards. The base stations 210 can communicate with the electronic apparatuses 100 via the wireless LANs. Since the wireless communication distance in communication via the wireless LANs is shorter than those in accordance with 3G and 4G, access points 211 such as rooters are located as repeaters between the base stations 210 and the electronic apparatuses 100.

The network 230 includes networks. Examples of the networks include a voice communication network 231 and a mobile network 232 (for example, the Internet such as IP network).

Figure 2:
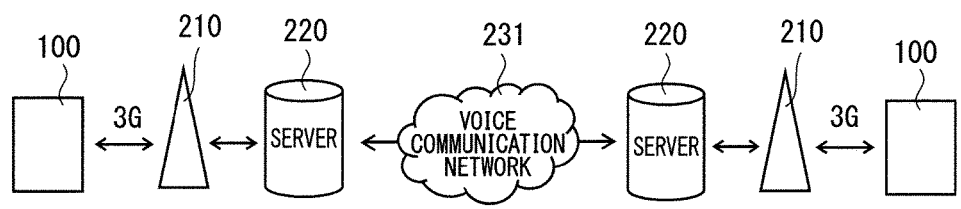
FIG. 2 schematically illustrates an example of a network in voice call.

The servers 220 transmit a signal transmitted from each of the base stations 210, to a network corresponding to the signal. For example, when the electronic apparatuses 100 communicate via the voice communication network 231, the servers 220 transmit and receive a signal via the voice communication network 231 (see also FIG. 2). When the electronic apparatuses 100 communicate via the mobile network 232, the servers 220 transmit and receive a signal via the mobile network 232 (see also FIGS. 3 and 4).

The electronic apparatuses 100 can communicate with one another via different networks. Specifically, the electronic apparatuses 100 may communicate via the voice communication network 231, for example, in communicating in accordance with 3G as exemplified by FIG. 2. Furthermore, the electronic apparatuses 100 may communicate via the mobile network 232, for example, in communicating in accordance with 4G as exemplified by FIG. 3. Furthermore, the electronic apparatuses 100 may communicate through the access points 211 via the mobile network 232 as exemplified by FIG. 4, for example, in communicating in accordance with the wireless LAN standards.

The path (FIG. 2) via the voice communication network 231 in accordance with 3G will also be referred to as a voice network, the path (FIG. 3) via the mobile network 232 in accordance with 4G will also be referred to as a communication network, and the path (FIG. 4) via the mobile network 232 in accordance with the wireless LAN standards will also be referred to as a wireless LAN network.

[Electronic Apparatus]
[External Appearance]

Figure 5:
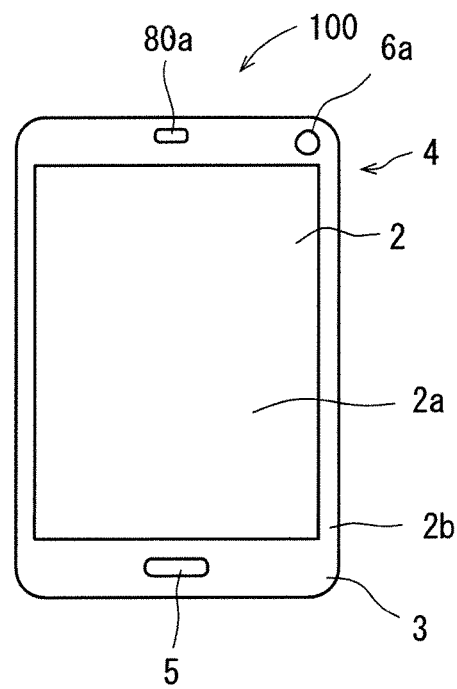
FIG. 5 illustrates a front view showing an example of an external appearance of an electronic apparatus.
Figure 6:
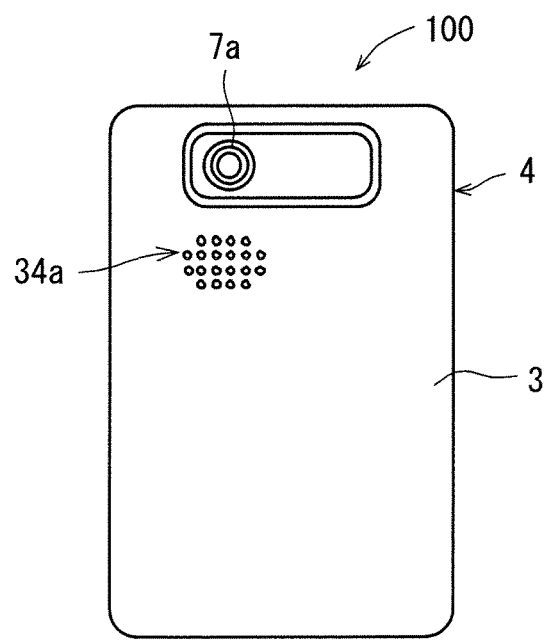
FIG. 6 illustrates a rear view showing an example of an external appearance of the electronic apparatus.

FIG. 5 illustrates an example of an external appearance of the electronic apparatus 100 when viewed from the front side. FIG. 6 illustrates a rear view showing an example of an external appearance of the electronic apparatus 100. This electronic apparatus 100 can communicate with the other electronic apparatus 100 via, for example, the base stations 210 and the servers 220. The electronic apparatus 100 is, for example, a mobile electronic apparatus, such as a tablet, a personal digital assistant (PDA), a mobile phone (smartphone), or a personal computer.

As illustrated in FIGS. 5 and 6, the electronic apparatus 100 includes a cover panel 2 and a case part 3. The combination of the cover panel 2 and the case part 3 comprises a case 4 forming, for example, an approximately rectangular plate in a plan view (hereinafter may be referred to as "apparatus case").

The cover panel 2 is, for example, approximately rectangular in a plan view, and is a portion other than the peripheral end in the front portion of the electronic apparatus 100. The cover panel 2 is formed of, for example, a transparent glass or a transparent acrylic resin. Alternatively, the cover panel 2 is made of, for example, sapphire. Sapphire is a single crystal mainly containing alumina ($Al_2O_3$), and is a single crystal whose purity of $Al_2O_3$ is approximately 90% or greater herein. The purity of $Al_2O_3$ is preferably greater than or equal to 99% to provide a greater resistance to damage of the cover panel 2.

The cover panel 2 may be a composite panel (laminated panel) with a multiple layer structure including a layer made of sapphire. For example, the cover panel 2 may be a composite panel with a two-layer structure of: a first layer made of sapphire and located on the surface of the electronic apparatus 100 (a sapphire panel); and a second layer made of glass and stuck on the first layer (a glass panel). Furthermore, the cover panel 2 may be a composite panel with a three-layer structure of: a first layer made of sapphire and located on the surface of the electronic apparatus 100 (a sapphire panel); a second layer made of glass and stuck on the first layer (a glass panel); and a third layer made of sapphire and stuck on the second layer (a sapphire panel).

Furthermore, the cover panel 2 may comprise a layer made of one of crystalline materials other than sapphire, such as diamond, zirconia, titania, crystal, lithium tantalite, and aluminum oxynitride.

The case part 3 comprises the peripheral end in the front portion, the side portion, and the rear portion of the electronic apparatus 100. The case part 3 is made of, for example, a polycarbonate resin.

The front surface of the cover panel 2 comprises a display area 2a on which various pieces of information such as characters, symbols, figures, and images are displayed. The display area 2a is, for example, rectangular in a plan view. A peripheral end 2b of the cover panel 2 that surrounds the display area 2a is opaque because of, for example, a film attached thereto, and is a non-display portion on which no information is displayed. A touch panel 52 to be described later is stuck on the rear surface of the cover panel 2. The user can provide various instructions to the electronic apparatus 100 by operating the display area 2a on the front surface of the electronic apparatus 100 using the finger or the like. The user can provide the various instructions to the electronic apparatus 100 also by operating the display area 2a with operators other than the finger, such as, pens for electrostatic touch panels including a stylus pen.

The apparatus case 4 comprises, for example, an operation key 5. The operation key 5 is, for example, a hardware key, and is located, for example, at the lower end on the front surface of the cover panel 2.

The touch panel 52 and the operation key 5 are examples of an input unit through which the user enters data into the electronic apparatus 100. Various inputs to be described hereinafter may be entered via the touch panel 52 or the operation key 5. The touch panel 52 will be typically used in the following description.

In various embodiments, the input unit may be implemented using any input technology or device known in the art such as, for example, a QWERTY keyboard, a pointing device (e.g., a mouse), a joy stick, a stylus, a touch screen display panel, a key pad, one or more buttons, etc., or any combination of these technologies.

[Electrical Configuration of Electronic Apparatus]

Figure 7:
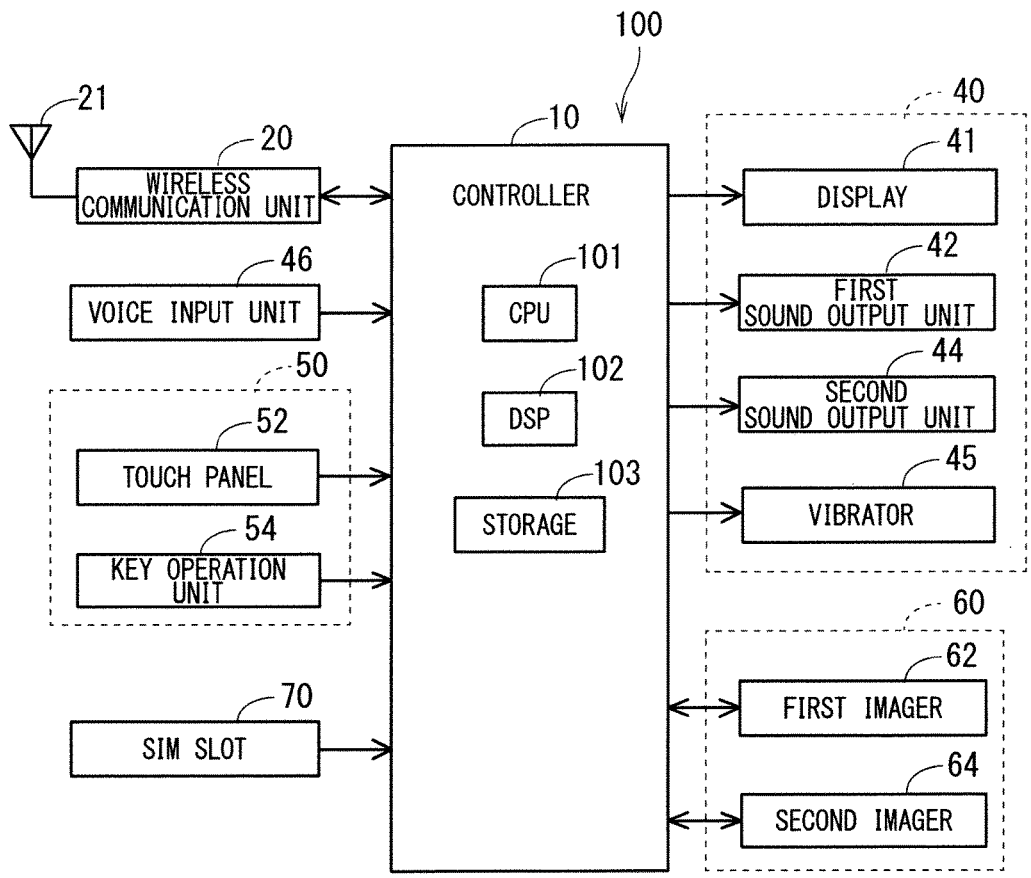
FIG. 7 schematically illustrates an example of an electrical configuration of the electronic apparatus.

FIG. 7 illustrates a block diagram showing an electrical configuration of the electronic apparatus 100. The electronic apparatus 100 in FIG. 7 includes, for example, a controller 10, a wireless communication unit 20, a display 41, a first sound output unit (herein a receiver) 42, a second sound output unit (herein a speaker) 44, a vibrator 45, a voice input unit 46, the touch panel 52, a key operation unit 54, an imager 60, and a SIM slot 70. The apparatus case 4 accommodates these constituent elements of the electronic apparatus 100.

The controller 10 includes, for example, a central processing unit (CPU) 101, a digital signal processor (DSP) 102, and a storage 103. The controller 10 manages the overall operations of the electronic apparatus 100 by controlling the other constituent elements of the electronic apparatus 100. The storage 103 includes, for example, a read only memory (ROM) and a random access memory (RAM). The storage 103 stores, for example, (i) main programs that are control programs for controlling operations of the electronic apparatus 100, specifically, for controlling the respective constituent elements of the electronic apparatus 100 such as the wireless communication unit 20 and the display 41, and (ii) application programs (simply referred to as "applications" hereinafter). The CPU 101 and the DSP 102 execute various programs in the storage 103 to achieve various functions of the controller 10. Although FIG. 7 illustrates the one CPU 101 and the one DSP 102, the controller 10 may include CPUs 101 and DSPs 102. The CPU 11 and the DPS 12 may cooperate with each other to achieve the various functions. Furthermore, although the storage 103 is inside the controller 10 in FIG. 7, it may be placed outside of the controller 10. In other words, the storage 103 may be separated from the controller 10. Furthermore, a part or a whole of the functions of the controller 10 may be achieved by hardware.

The controller 10 includes at least one processor for providing control and processing capability to perform various functions as described in further detail below. In accordance with various embodiments, the at least one processor 100 may be implemented as a single integrated circuit (IC) or as multiple communicatively coupled IC's and/or discrete circuits. It is appreciated that the at least one processor 100 can be implemented in accordance with various known technologies.

In one embodiment, the processor includes one or more circuits or units configurable to perform one or more data computing procedures or processes by executing instructions stored in an associated memory, for example. In other embodiments, the processor 100 may be implemented as firmware (e.g. discrete logic components) configured to perform one or more data computing procedures or processes.

In accordance with various embodiments, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

The wireless communication unit 20 may be a communication circuit, and includes an antenna 21. The wireless communication unit 20 can communicate with networks (for example, a voice network, a communication network, and a wireless LAN network) via the antenna 21. The networks herein are, for example, networks having different communication protocols. For example, the wireless communication unit 20 can communicate with the base stations 210 directly or through the access points 211. The wireless communication unit 20 amplifies and down-converts a received signal, and outputs a resulting signal to the controller 10. The controller 10, for example, demodulates the received signal. Furthermore, the wireless communication unit 20 up-converts and amplifies a transmission signal generated by the controller 10, and wirelessly transmits the processed transmission signal from the antenna 21.

The display 41 is, for example, a liquid crystal display panel or an organic electro luminescent (EL) panel. The display 41 displays the various pieces of information such as characters, symbols, figures, and images by control of the controller 10. The information displayed on the display 41 is displayed in the display area 2a on the front surface of the cover panel 2. Thus, the display 41 displays information in the display area 2a.

The touch panel 52 detects an operation of an operator, such as the finger, in the display area 2a of the cover panel 2. The touch panel 52 is, for example, a projected capacitive touch panel, and stuck on the rear surface of the cover panel 2. For example, when the user operates the display area 2a of the cover panel 2 using an operator, such as his/her finger, the touch panel 52 enters the corresponding signal into the controller 10. The controller 10 identifies details of the operation performed in the display area 2a, based on the signal from the touch panel 52, and performs a process corresponding to the identified details. The touch panel 52 may be a pressure-sensitive touch panel.

Since the touch panel 52 detects an operation of the user corresponding to the details displayed on the display 41, the touch panel 52 and the display 41 comprise an input unit by cooperating with each other.

The key operation unit 54 detects an operation of depressing the operation key 5 by the user. The key operation unit 54 determines whether the operation key 5 is depressed. When the operation key 5 is not depressed, the key operation unit 54 outputs, to the controller 10, a non-operated signal indicating that the operation key 5 is not operated. Furthermore, when the operation key 5 is depressed, the key operation unit 54 outputs, to the controller 10, an operation signal indicating that the operation key 5 is operated. Accordingly, the controller 10 can determine whether the operation key 5 is operated.

Each of the touch panel 52 and the operation key 5 functions as an input unit to the electronic apparatus 100. Any input using the touch panel 52 to be described hereinafter can be assigned to the operation key 5.

The first sound output unit (for example, the receiver) 42 outputs received sound, and is, for example, a dynamic speaker. The first sound output unit 42 converts an electric sound signal from the controller 10 into a sound, and then outputs the sound. The sound output from the first sound output unit 42 is output from a receiver hole 80a formed on the front surface of the electronic apparatus 100 to the outside. The volume of the sound output from the receiver hole 80a is smaller than the volume of the sound output from the second sound output unit 44 through speaker holes 34a.

As a replacement for the first sound output unit 42, a piezoelectric vibrator may be located. The piezoelectric vibrator is controlled by the controller 10, and vibrates based on a voice signal. The piezoelectric vibrator is located, for example, on the rear surface of the cover panel 2, and vibrates the cover panel 2 with the own vibration based on the voice signal. Accordingly, the vibration of the cover panel 2 is transmitted to the ears of the user as voice. Here, the receiver hole 80a is unnecessary.

The second sound output unit (for example, a speaker) 44 is, for example, a dynamic speaker, and converts an electric sound signal from the controller 10 into a sound, and then outputs the sound. The sound output from the second sound output unit 44 is output from the speaker holes 34a formed on the rear surface of the electronic apparatus 100 to the outside. The volume of the sound output from the speaker holes 34a is adjusted to be heard at a location distant from the electronic apparatus 100. In other words, the volume of the second sound output unit (speaker) 44 is larger than that of the first sound output unit (receiver or piezoelectric vibrator) 42.

The voice input unit 46 is, for example, a microphone, and converts the voice entered from outside of the electronic apparatus 100 into an electric sound signal and outputs the electric sound signal to the controller 10. The voice from the outside of the electronic apparatus 100 enters the voice input unit 46 from a microphone hole formed on the front surface of the cover panel 2 to the electronic apparatus 100.

The vibrator 45 vibrates under control by the controller 10. The vibration is transferred to the case 4 of the electronic apparatus 100. Accordingly, the user can receive a notice from the electronic apparatus 100.

Each of the display 41, the first sound output unit 42, the second sound output unit 44, and the vibrator 45 is an example of a notifier 40 to the effect that it can notify the user of information.

The imager 60 includes, for example, a first imager 62 and a second imager 64. The first imager 62 includes, for example, an imaging lens 6a and an imaging sensor, and images a still image and a moving image based on the control by the controller 10. As illustrated in FIG. 5, the imaging lens 6a located on the front surface of the electronic apparatus 100 can image an object in front of the electronic apparatus 100 (toward the cover panel 2).

The second imager 64 includes, for example, an imaging lens 7a and an imaging sensor, and images a still image and a moving image based on the control by the controller 10. As illustrated in FIG. 6, the imaging lens 7a located on the rear surface of the electronic apparatus 100 can image an object in the rear of the electronic apparatus 100.

A subscriber identity module (SIM) card is inserted into the SIM slot 70. This SIM card is an integrated circuit (IC) card, and records, for example, a telephone number as subscriber information. The controller 10 can read this telephone number from the SIM card inserted into the SIM slot 70.

Furthermore, SIM cards may be inserted into the SIM slot 70. The SIM cards store respective different telephone numbers. The user designates one of the SIM cards using an input unit 50. The controller 10 reads a telephone number from the SIM card designated by the user so that the user can communicate using this telephone number.

Accordingly, the one electronic apparatus 100 can switch between telephone numbers for use. For example, a mobile phone to which two SIM cards can be inserted is called a dual SIM mobile phone. Here, the user can switch, for example, between a private telephone number and a business telephone number using the one electronic apparatus 100.

[Controller]

Figure 8:
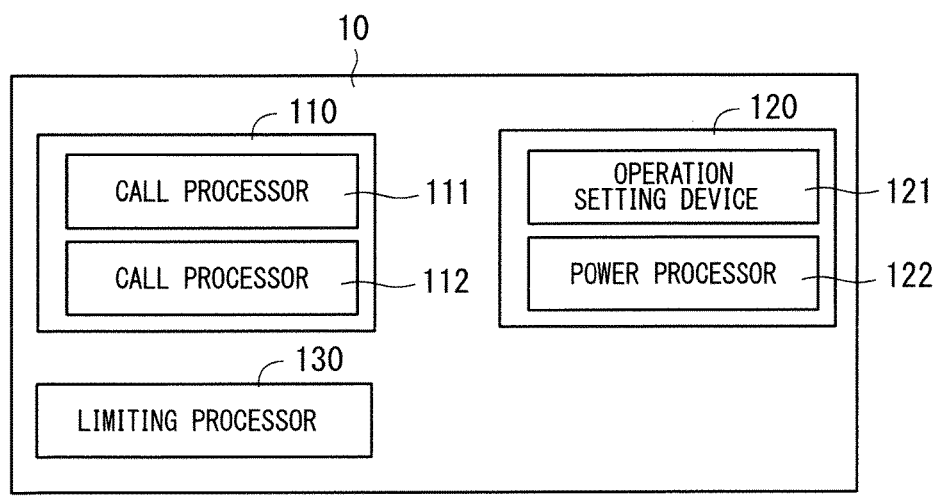
FIG. 8 schematically illustrates an example of a configuration of a controller.

FIG. 8 illustrates a functional block diagram schematically showing an example of an internal configuration of the controller 10. The controller 10 includes a call processor 110, a function processor 120, and a limiting processor 130. These functional processors may be implemented by software, or a part or a whole of the functional processors may be implemented by hardware.

The controller 10 has multi-task functions. Thus, the call processor 110, an operation setting device 121, and the limiting processor 130 can be operated in parallel by, for example, time division.

The call processor 110 can process, through the wireless communication unit 20, for example, a call via a voice network (hereinafter referred to as "voice call"), a call via a communication network (hereinafter referred to as "communication call"), and a call via a wireless LAN network (hereinafter referred to as "wireless LAN call").

Figure 9:
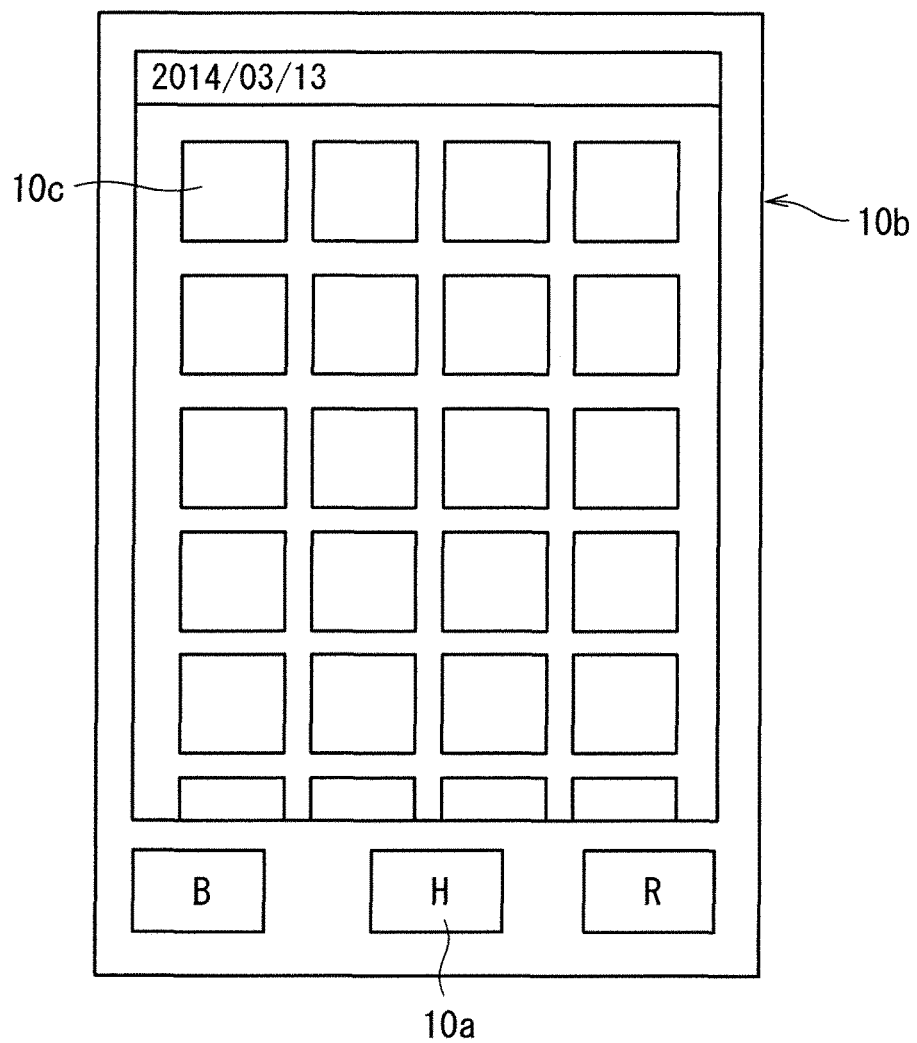
FIG. 9 schematically illustrates an example of a home screen.

In FIG. 8, the call processor 110 includes, for example, call processors 111 and 112. Each of the call processors 111 and 112 is activated, for example, according to an operation of the user. For example, the controller 10 causes the display 41 to display a home screen. FIG. 9 schematically illustrates an example of a home screen 10b. In this home screen 10b, elements 10c (for example, icons) each of which functions as a button are displayed in list form. These elements 10c correspond to various applications. When the user operates, for example, one of the elements 10c, the touch panel 52 detects the operation, and enters it into the controller 10. The controller 10 executes the corresponding application. For example, the call processor 111 is activated upon selection of the element 10c indicating the call processor 111, whereas the call processor 112 is activated upon selection of the element 10c indicating the call processor 112.

The call processor 111 causes the display 41 to display a call screen (not illustrated) after the activation. In the call screen, an input button of address information indicating a called party (for example, a telephone number), and an input button instructing to call are displayed. When the user operates for designating a called party and instructing to call, the touch panel 52 detects these operations, and enters them into the call processor 111. The call processor 111 transmits the calling signal to the electronic apparatus 100 of the called party via the wireless communication unit 20.

When the electronic apparatus 100 of the called party receives the calling signal as an incoming call signal, the electronic apparatus 100 informs the receipt to the called party and receives an instruction about whether to reply to the incoming call. When the called party instructs the electronic apparatus 100 not to reply, the electronic apparatus 100 blocks the call and ends the call processing. On the other hand, when the called party instructs the electronic apparatus 100 to reply, the electronic apparatus 100 transmits the acknowledgement signal to the electronic apparatus 100 of the calling party through the same route, and starts the communication.

FIG. 10 schematically illustrates an example of a call screen 110a to be displayed on the display 41 during a call. In the call screen 110a, an element 110b functioning as a button for ending the call is displayed. When the user operates the element 110b, the touch panel 52 detects this operation, and enters it into the call processor 111. In response to the operation, the call processor 111 ends the call.

Furthermore, in the example of FIG. 10, an element 10a is also displayed in the call screen 110a. This element 10a functions as a button for switching a screen on the display 41 from the call screen 110a to the home screen 10b. When the user operates the element 10a, the touch panel 52 detects this operation, and enters it into the controller 10. In response to this operation, the controller 10 causes the display 41 to temporarily finish displaying the call screen 110a and display the home screen 10b.

Since the controller 10 has the multi-task functions as described above, even when the home screen 10b is displayed on the display 41, the call processor 111 executes the call processing.

Figure 3:
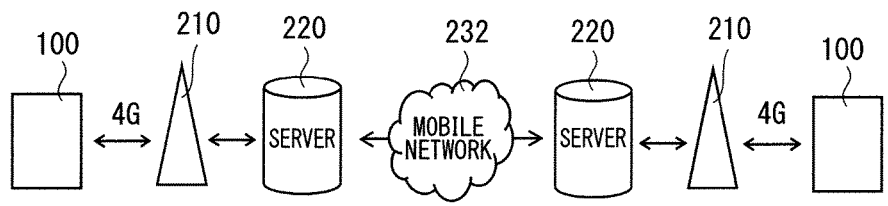
FIG. 3 schematically illustrates an example of a network in communication call.

The operations of the call processor 112 are the same as those of the call processor 111, but differ from those of the call processor 111 in network to be used for call. The call processor 111 can process, for example, a voice call via a voice network and a communication call via a communication network. In other words, the call processor 111 can process a voice call via the voice communication network 231 in accordance with 3G (FIG. 2), and a communication call via the mobile network 232 in accordance with 4G (FIG. 3).

The call processor 111 can understand the telecommunications standards corresponding to the respective base stations 210, through communication with the base stations 210. Here, the call processor 111 may process a voice call and a communication call as follows. For example, when the electronic apparatus 100 is within a communication zone of the base station 210 that does not comply with 4G, the call processor 111 processes a voice call in accordance with 3G to communicate with the base station 210. Furthermore, when the electronic apparatus 100 is within a communication zone of the base station 210 that complies with 4G, the call processor 111 processes a communication call in accordance with 4G to communicate with the base station 210.

Figure 4:
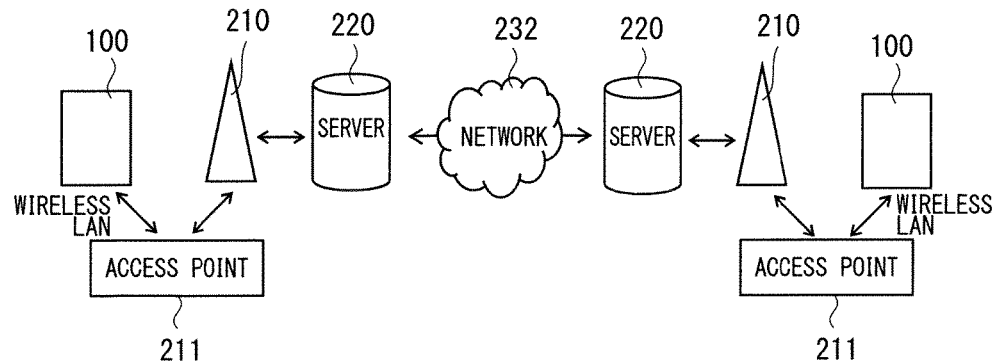
FIG. 4 schematically illustrates an example of a network in wireless LAN call.

Meanwhile, the call processor 112 can process a wireless LAN call via a wireless LAN network (FIG. 4).

Upon receipt of an incoming call, a call processor corresponding to a network used by, for example, the electronic apparatus 100 of the called party may perform incoming call processing. For example, the call processor 111 may perform the incoming call processing upon receipt of an incoming call signal via a voice network or a communication network, or the call processor 112 may perform the incoming call processing upon receipt of an incoming call signal via a wireless LAN network.

The incoming call processing may be performed as follows, for example. Upon receipt of an incoming call signal, the call processor 110 causes, for example, the second sound output unit 44 to output sound and the display 41 to display an incoming call screen (not illustrated), to inform the receipt to the user. The incoming call screen displays an element indicating whether to reply to this incoming call. When the user enters a reply, a call with the electronic apparatus 100 of the called party starts. When the user enters a refusal, the communication is terminated to end the call.

Furthermore, the operations between the call processors 111 and 112 may differ in address information of the called party. For example, the call processor 111 may use subscriber information (for example, a telephone number) stored in a SIM card, and the call processor 112 may use, for example, an IP address or a mail address without using a SIM card.

The function processor 120 can execute various functions according to an input to the input unit 50. Specific examples of the various functions will be described later. Some of the functions involve termination of communication via at least one of a voice network, a communication network, and a wireless LAN network. Examples of the functions include itemizing settings on each network. The specific examples include a setting for turning ON or OFF a wireless LAN. If a wireless LAN is disabled, communication via the wireless LAN network is terminated.

For example, the function processor 120 includes the operation setting device 121 and a power processor 122 (see also FIG. 8). The operation setting device 121 is a functional device that changes a setting to the electronic apparatus 100, according to an input by the user. This setting will be described later.

The function processor 120 (specifically, the operation setting device 121) can cause the display 41 to display a setting screen. Examples of the setting screen include a notification in Android™ operating system.

FIG. 11 schematically illustrates an example of a notification screen 10d. In this notification screen 10d, an element 121b for changing some settings is displayed. The element 121b represents, for example, within a rectangle frame, a setting with a corresponding symbol. For example, the element 121b at the upper left portion of the notification screen 10d is an element that turns ON or OFF a wireless LAN. The user can change the setting corresponding to the element 121b by operating the element 121b. For example, each time the element 121b at the upper left portion in FIG. 11 is operated, the operation setting device 121 switches between ON and OFF of the wireless LAN.

Furthermore, examples of the setting screen also include a menu screen that displays various settings in list form. This setting screen can be called from, for example, the notification screen 10d. For example, an element 121a for calling the setting screen is displayed in the notification screen 10d. When the user operates the element 121a, the touch panel 52 detects this operation, and enters it into the operation setting device 121. The operation setting device 121 causes the display 41 to display a setting menu screen 10e.

FIG. 12 schematically illustrates an example of the setting menu screen 10e. For example, various settings are organized into layer groups, and lower layer groups are displayed below upper layer groups in list form in the menu screen 10e. Each of the lower layer groups may function as a button for the selection itself. For example, when the user operates an element 121c displayed as "WIRELESS LAN SETTING" that is an example of the lower layer groups, the operation setting device 121 receives the operation from the touch panel 52, and causes the display 41 to display a menu screen (not illustrated) that displays settings belonging to "WIRELESS LAN SETTING" in list form.

As described above, the user appropriately selects each of the groups to display a menu screen corresponding to a lower layer, which enables the display 41 to display necessary settings. Furthermore, the user selects an element corresponding to a setting from the menu screen, and changes the setting.

The element that functions as a button for changing a setting may be displayed not only in the notification screen 10d and a menu screen but also in the home screen 10b. For example, a function of changing a setting may be assigned to one of the elements 10c. Here, the user can change a setting by operating the element 10c. Alternatively, a function of calling a menu screen may be assigned to one of the elements 10c in the home screen 10b.

Next, specific examples of the settings will be described. With this change of settings, communication via at least one of a voice network, a communication network, and a wireless LAN network is terminated. Some settings obviously do not involve such termination of the communication; however, the description of such settings will be omitted herein.

FIG. 13 illustrates a table showing an example of various functions executed by the function processor 120. FIG. 13 shows the various functions and types of calls to be disconnected by the functions. The various functions include settings. Examples of the settings include change in SIM card, change in network operator, change in network type, change in user, an airplane mode, initialization, system update, turning ON or OFF communication data, turning ON or OFF Long-Term Evolution (LTE), turning ON or OFF a wireless LAN, and disconnection of a connected wireless LAN and connection to another access point.

The change in SIM card is a setting when SIM cards can be inserted into the SIM slot 70. This setting determines which one of the SIM cards is to be used. When the user operates an element corresponding to this setting to select a SIM card, the touch panel 52 detects the operation, and outputs it to the operation setting device 121. The operation setting device 121 sets the selected SIM card after temporarily terminating communication via networks in accordance with 3G and 4G. Subsequently, the call processor 111 processes a call using a telephone number of the set SIM card.

According to the change in SIM card, the communication via the networks in accordance with 3G and 4G is terminated. Thus, the change in SIM card during a voice call or a communication call results in disconnection of the call.

The network operator is, for example, a mobile network operator. For example, a network system includes the base stations 210 authorized by respective network operators. The same holds true for the servers 220 and the network 230. The user selects and sets a network operator. The electronic apparatus 100 communicates using each of elements authorized by the set network operator.

When the user operates an element of the setting indicating change in the network operator to select a network operator, the touch panel 52 detects the operation, and outputs it to the operation setting device 121. The operation setting device 121 changes the network operator after temporarily terminating the communication via the networks in accordance with 3G and 4G. Subsequently, the electronic apparatus 100 communicates using each of these elements authorized by the set network operator.

According to the change in network operator, the communication via the networks in accordance with 3G and 4G is terminated. Thus, the change in network operator during a voice call or a communication call results in disconnection of the call.

The network type refers to, for example, a type of telecommunications standard, such as 3G and 4G. Change in the network type indicates change as to which telecommunications standard is to be used, for example, 3G or 4G. For example, the user selects a mode in which only 3G is used, a mode in which only 4G is used, or a mode in which both 3G and 4G are used. When the user operates an element of the setting indicating change in the network type to select one of these modes, the touch panel 52 detects the operation, and outputs it to the operation setting device 121. The operation setting device 121 sets the electronic apparatus 100 so that the electronic apparatus 100 uses the telecommunications standard in the selected mode. Subsequently, the electronic apparatus 100 communicates in accordance with the set telecommunications standard.

Thus, when, for example, only 3G is used, communication via a network in accordance with 4G is terminated. Furthermore, when, for example, only 4G is used, communication via a network in accordance with 3G is terminated. Thus, when only 4G is used during a voice call, the voice call is disconnected. Furthermore, when only 3G is used during a communication call, the communication call is also disconnected.

The change in user is a setting when the controller 10 can set user accounts. The controller 10 manages the respective user accounts, and allows the user to use a function of the electronic apparatus 100 for each of the user accounts. For example, a file created when a user logs in with a user account may be used only with the user account.

The change in user is a setting for changing this user account. When the user operates an element of the setting indicating the change in user, the touch panel 52 detects the operation, and outputs it to the operation setting device 121. The operation setting device 121 changes the user account after temporarily terminating the communication via all the networks. Thus, with the change in user during one of a voice call, a communication call, and a wireless LAN call, the call is disconnected.

The airplane mode is a mode mainly used when the user boards an airplane, and is a mode for terminating the communication via all the networks. When the user operates an element of the setting indicating the airplane mode, the touch panel 52 detects the operation, and outputs it to the operation setting device 121. The operation setting device 121 sets the airplane mode to terminate the communication via all the networks. Thus, when the airplane mode is set during one of a voice call, a communication call, and a wireless LAN call, the call is disconnected.

The initialization is a function of initializing the various settings. The various settings are initialized to, for example, a factory shipping state. When the user operates an element of the setting indicating the initialization, the touch panel 52 detects the operation, and outputs it to the operation setting device 121. The operation setting device 121 initializes the various settings after temporarily terminating the communication via all the networks. Thus, when the initialization is set during one of a voice call, a communication call, and a wireless LAN call, the call is disconnected.

The system update is a function of updating the operating system operated by the controller 10. When the user operates an element of the setting indicating the system update, the touch panel 52 detects the operation, and outputs it to the operation setting device 121. For example, when the storage 103 stores an update program that has not yet been executed, the operation setting device 121 executes the update program to update the operating system after terminating the communication via all the networks. Thus, when the system update is set during one of a voice call, a communication call, and a wireless LAN call, the call is disconnected.

Turning ON or OFF communication data is a function of setting validity or invalidity of the communication via the mobile network 232 in accordance with 3G and 4G. When the user operates an element of the setting indicating the turning ON or OFF communication data, the touch panel 52 detects the operation, and outputs it to the operation setting device 121. When the user enters turning-ON the communication data, the operation setting device 121 sets the electronic apparatus 100 so that the electronic apparatus 100 uses the mobile network 232 in accordance with 3G or 4G. When the user enters turning-OFF the communication data, the operation setting device 121 sets the electronic apparatus 100 so that the electronic apparatus 100 does not use the mobile network 232 in accordance with 3G or 4G. Thus, when the communication data is turned OFF during a communication call, the communication call is disconnected.

Although the communication via a communication network is terminated by turning OFF the communication data, the communication via the voice communication network 231 is not terminated. Thus, even when the communication data is turned OFF during a voice call via a voice network, the voice call can be continued.

The turning ON or OFF the LTE is a function of setting validity or invalidity of the communication in accordance with the LTE that is one of the network types of 4G. When the user operates an element of the setting indicating the turning ON or OFF the LTE, the touch panel 52 detects the operation, and outputs it to the operation setting device 121. When the user enters turning-ON the LTE, the operation setting device 121 sets the electronic apparatus 100 so that the electronic apparatus 100 uses a network in accordance with the LTE. When the user enters turning-OFF the LTE, the operation setting device 121 sets the electronic apparatus 100 so that the electronic apparatus 100 does not use the network in accordance with the LTE. Thus, when the LTE is turned OFF during a communication call, the communication call is disconnected.

The turning ON or OFF a wireless LAN is a function of setting validity or invalidity of the communication via the wireless LAN. When the user operates an element of the setting indicating the turning ON or OFF a wireless LAN, the touch panel 52 detects the operation, and outputs it to the operation setting device 121. When the user enters turning-ON a wireless LAN, the operation setting device 121 sets the electronic apparatus 100 so that the electronic apparatus 100 uses the wireless LAN. When the user enters turning-OFF a wireless LAN, the operation setting device 121 sets the electronic apparatus 100 so that the electronic apparatus 100 does not use the wireless LAN. Thus, when the wireless LAN is turned OFF during a wireless LAN call, the wireless LAN call is disconnected.

The disconnection of a connected wireless LAN is a function of terminating communication via a wireless LAN during the communication. When the user operates an element of the setting indicating the disconnection of a connected wireless LAN, the touch panel 52 detects the operation, and outputs it to the operation setting device 121. The operation setting device 121 terminates the communication via the wireless LAN. Thus, when the disconnection of a connected wireless LAN is set during a wireless LAN call, the wireless LAN call is disconnected.

The connection to another access point is a function of connecting to another access point different from the access point that is currently being communicated. When the user operates an element of the setting indicating the connection to another access point, the touch panel 52 detects the operation, and outputs it to the operation setting device 121. The operation setting device 121 detects another access point, and causes the display 41 to display this point. When the user selects the other access point, the touch panel 52 detects this operation, and outputs it to the operation setting device 121. The operation setting device 121 terminates the communication with the connected access point, and sets the connection to the other access point. Thus, when the connection to the other access point is set during a wireless LAN call, the wireless LAN call is disconnected.

The power processor 122 processes the power of the electronic apparatus 100 according to an input by the user. For example, when the user enters turning-OFF the power through the input unit 50, the power processor 122 turns OFF the power of the electronic apparatus 100. Accordingly, the communication via all the networks is terminated.

Furthermore, when the user enters a reboot into the input unit 50, the power processor 122 reboots the electronic apparatus 100 after temporarily terminating the communication via all the networks.

Thus, when the user enters the turning-OFF power or the reboot during one of a voice call, a communication call, and a wireless LAN call, the call is disconnected.

As described above, with an input for executing each of the various functions (change in the settings, the turning-OFF power, and the reboot), a network corresponding to the function is disconnected. When such a network is disconnected during a call via the network, the call is disconnected.

Since the user can end a call with a first operation using the element 110b in the call screen 110a, disconnection of the call with an operation other than this first operation on the element 110b is not intended by the user but can be regarded as an operating error. In other words, inputs corresponding to changes in the various settings, the turning-OFF power, and the reboot during a call can be regarded as operating errors.

Thus, during a call with the call processor 110, the limiting processor 130 limits at least one of (i) a function of terminating communication via a network to be used in the call and (ii) an input that triggers the function. Accordingly, while the user is on a call, the limiting reduces the possibility of executing the function by an operating error and, accordingly, reduces the possibility of disconnecting a call without any intention.

For example, the call processor 110 should notify the limiting processor 130 of information indicating whether the user is on a call and information on a type of the call (a voice call, a communication call, or a wireless LAN call).

Specific examples of the limiting includes disabling the various functions by the limiting processor 130. For example, during a voice call with the call processor 111, the limiting processor 130 disables the function involving termination of communication via the voice network. In the examples above, the limiting processor 130 disables turning-OFF power, reboot, and the settings of: change in SIM card, change in network operator, change in network type, change in user, airplane mode, initialization, and system update (see FIG. 13). The limiting processor 130 performs the limiting by, for example, outputting a limiting instruction to the function processor 120. The limiting instruction contains information for designating a function to be limited. Accordingly, even when the user enters change in the settings, the turning-OFF power, or the reboot during a voice call, the function processor 120 does not execute the function corresponding to the input. Thus, the voice call can be maintained without terminating communication via the voice network.

For example, during a communication call with the call processor 111, the limiting processor 130 disables the function involving termination of communication via the communication network. In the example above, the limiting processor 130 disables turning-OFF power, reboot, and the settings of: turning OFF communication data, turning OFF the LTE, change in SIM card, change in network operator, change in network type, change in user, airplane mode, initialization, and system update. Accordingly, even when the user enters change in these settings, the turning-OFF power, or the reboot during a communication call, the function processor 120 does not execute the function corresponding to the input. Thus, the communication call can be maintained without terminating the communication via the communication network.

For example, during a wireless LAN call with the call processor 112, the limiting processor 130 disables the function involving termination of communication via the wireless LAN network. In the example above, the limiting processor 130 disables turning-OFF power, reboot, and the settings of: turning OFF the wireless LAN, disconnection of a connected wireless LAN, connection to another access point, change in user, airplane mode, initialization, and system update. Accordingly, even when the user enters change in these settings, the turning-OFF power, or the reboot during a wireless LAN call, the function processor 120 does not execute the function corresponding to the input. Thus, the wireless LAN call can be maintained without terminating the communication via the wireless LAN network.

Figure 14:
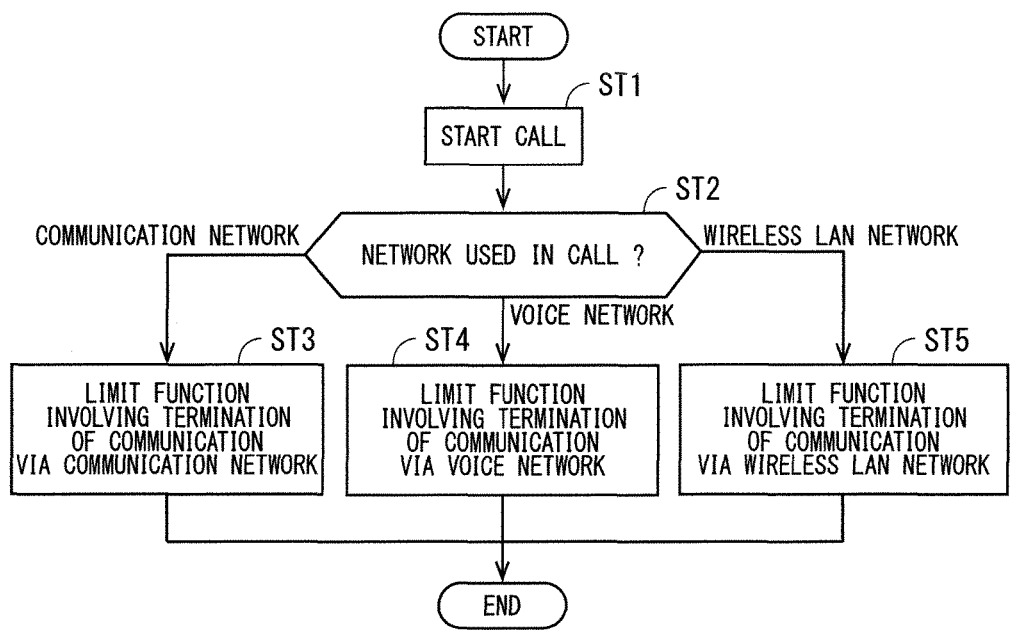
FIG. 14 schematically illustrates a flowchart showing an example of operations performed by the controller.

FIG. 14 illustrates a flowchart showing an example of operations performed by the controller 10. At a step ST1, the call processor 110 starts a call according to an input of the user. For example, the call starts when the call processor 110 responds to an incoming call from a called party, or when the call processor 110 transmits a calling signal to the called party and the called party responds to this.

Next, at a step ST2, the limiting processor 130 determines a type of a network used in the call. Specifically, the limiting processor 130 determines whether this call is a communication call, a voice call, or a wireless LAN call. This information can be obtained from the call processor 110.

When a communication network is used, the limiting processor 130 limits a function involving termination of communication via the communication network at a step ST3. Furthermore, when a voice network is used, the limiting processor 130 limits a function involving termination of communication via the voice network at a step ST4.

Furthermore, when a wireless LAN network is used, the limiting processor 130 limits a function involving termination of communication via the wireless LAN network at a step ST5.

The end of a call may trigger the limiting to be canceled.

Accordingly, during a call, an operating error induced by executing a function of terminating communication via a network used in the call hardly causes disconnection of the call.

The type and the number of networks whose communication is to be terminated by each of the various functions differ depending on the function. Examples of the various functions include a function of terminating communication via only a type of a network, a function of terminating communication via two types of networks, and a function of terminating communication via all of networks. Such functions are ascertained, and the functions are appropriately limited herein according to each type of the calls. Thus, it is possible to appropriately reduce, during a call, the possibility of wrongly executing a function of terminating communication via a network used in the call.

Figure 15:
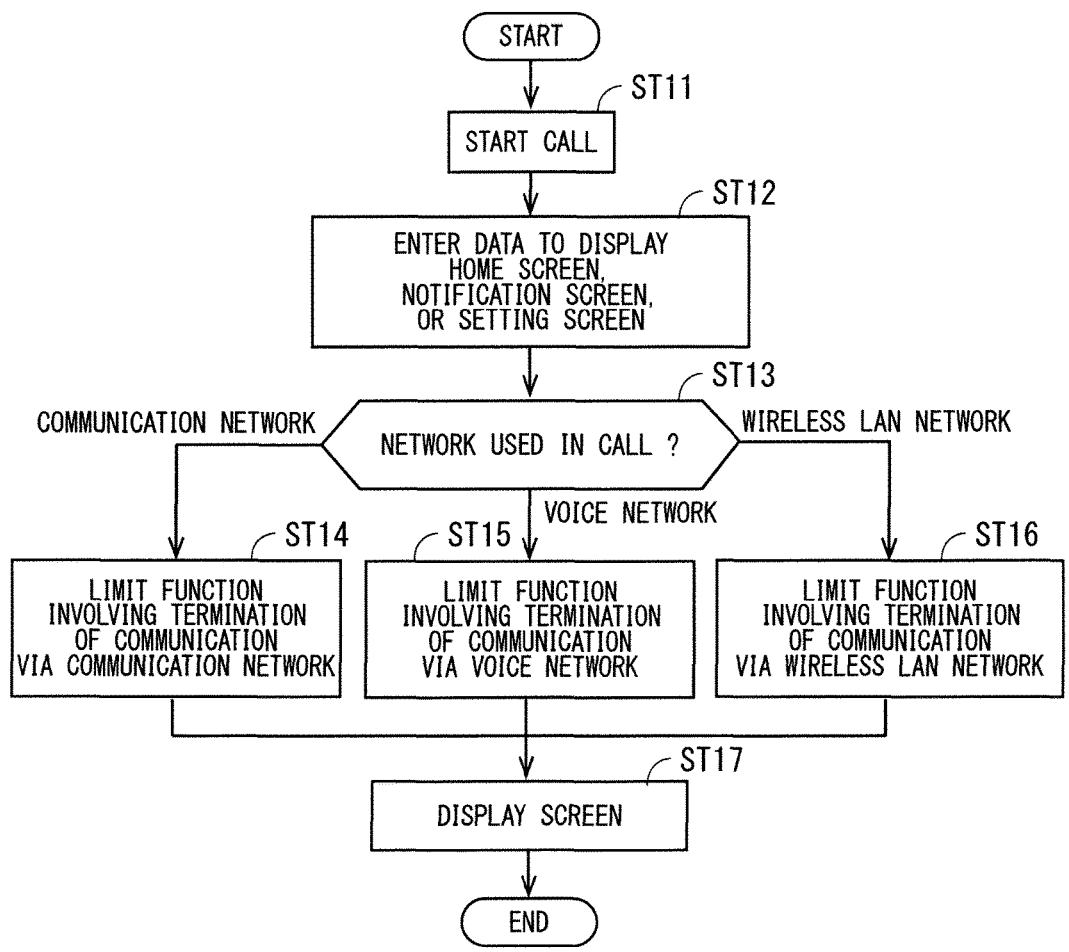
FIG. 15 schematically illustrates a flowchart showing an example of operations performed by the controller.

Although in the examples above, the limiting processor 130 performs the limiting using the start of a call as a trigger, the limiting is not limited to such. The limiting may be performed when a setting screen (for example, the home screen 10b, the notification screen 10d, or the menu screen 10e) including elements corresponding to functions is displayed on the display 41. FIG. 15 illustrates a flowchart showing an example of operations performed by the controller 10. At a step ST11, the call processor 110 starts a call according to an input of the user. Next, at a step ST12, the user enters data into the input unit 50 to display a setting screen.

Next, at a step ST13, the limiting processor 130 determines a type of a network used in the call. Furthermore, when a communication network is used, the limiting processor 130 limits a function involving termination of communication via the communication network at a step ST14. When a voice network is used, the limiting processor 130 limits a function involving termination of communication via the voice network at a step ST15. When a wireless LAN network is used, the limiting processor 130 limits a function involving termination of communication via the wireless LAN network at a step ST16.

Through one of the steps ST14 to ST16, the function processor 120 causes, at a step ST17, the display 41 to display a setting screen (a home screen, a notification screen, or a menu screen) including elements corresponding to functions according to the input at the step ST12.

With these operations, the limiting (the steps ST13 to ST16) can be performed using, as a trigger, an input (the step ST12) for displaying a screen (a home screen, a notification screen, or a menu screen) including elements corresponding to the respective functions. Accordingly, the limiting can be performed when needed. Specifically, since any element for executing the functions is not displayed in the call screen 110a, the limiting is not performed yet at this stage. When a screen including the elements is displayed, the limiting is performed. This operation can avoid the limiting from being unnecessarily performed.

Furthermore, a decision at the step ST13 may be made prior to the step ST12, a result of the decision may be stored in, for example, the storage 103, and the limiting (one of the steps ST14 to ST16) corresponding to the decision may be performed after the step ST12.

[Display Mode]

Figure 16:
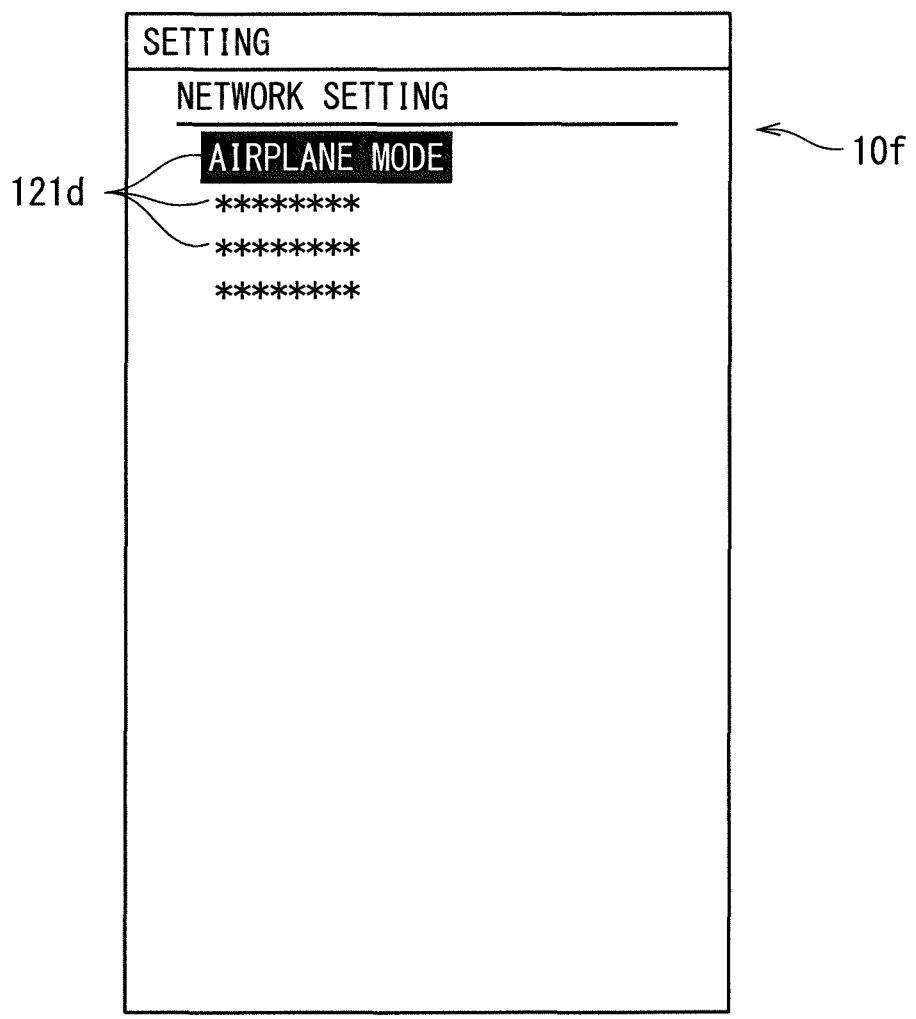
FIG. 16 schematically illustrates an example of a menu screen.

The function processor 120 may cause the display 41 to display an element corresponding to a function of the limiting during a call, in a display mode different from the normal display mode. FIG. 16 schematically illustrates an example of a menu screen 10f for setting a network. In the menu screen 10f, elements 121d corresponding to settings are displayed and one of the elements 121d is displayed as "AIRPLANE MODE". Here, the setting of "AIRPLANE MODE" is limited, and the "AIRPLANE MODE" is displayed in outline letters in the example of FIG. 16. Although the outline letters are used to simplify the illustration in FIG. 16, they may be displayed in, for example, gray letters (i.e., grayed out). The other elements 121d may be displayed in black letters. Accordingly, the user can easily understand that the limiting is performed in changing the setting of "AIRPLANE MODE".

Since the setting of "AIRPLANE MODE" is not limited without any call, the function processor 120 causes the display 41 to display the element of the setting in the normal display mode. Specifically, without any call, the function processor 120 causes the display 41 to display elements corresponding to the respective various functions in a first display mode. During a call, the function processor 120 causes the display 41 to display an element corresponding to the limiting function in a second display mode different from the first display mode.

Figure 17:
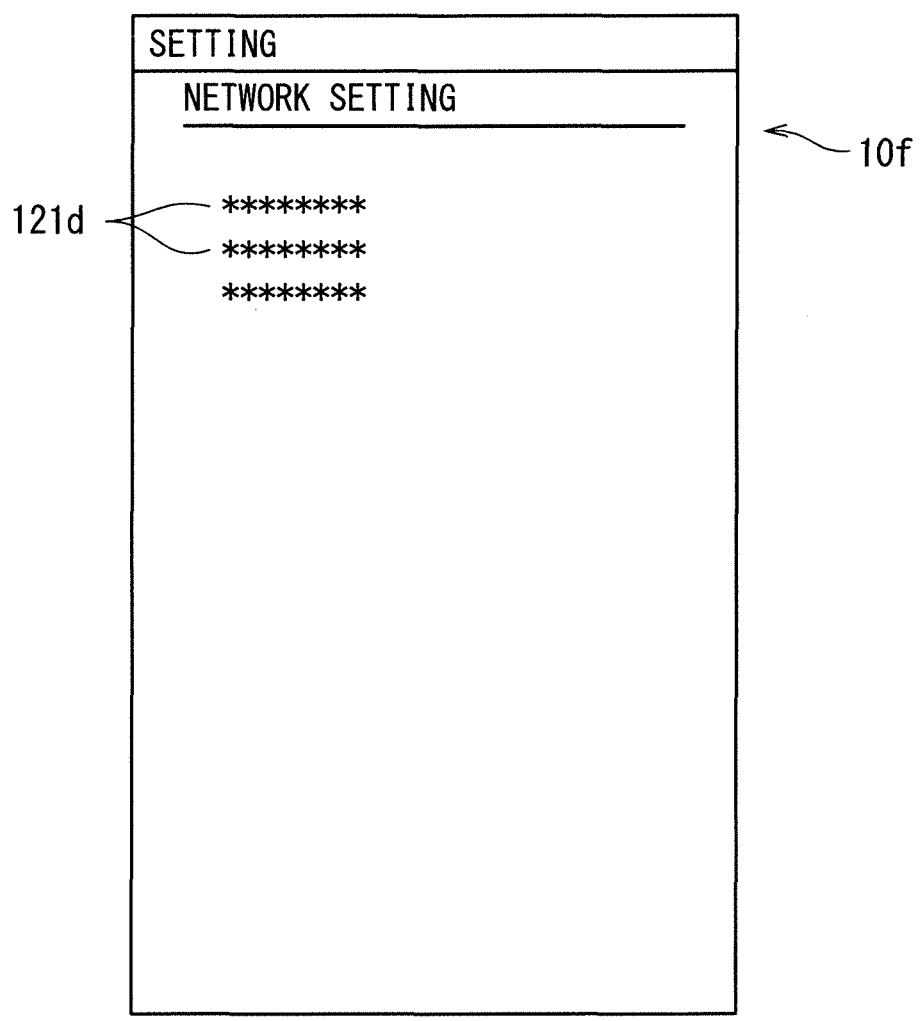
FIG. 17 schematically illustrates an example of a menu screen.

Furthermore, the function processor 120 does not have to display an element corresponding to a function to be disabled as illustrated in FIG. 17. In the example of FIG. 17, the element 121d of "AIRPLANE MODE" is not displayed. Specifically, without any call, the function processor 120 causes the display 41 to display the elements corresponding to the respective various functions. During a call, the function processor 120 does not display an element corresponding to a function to be disabled. Accordingly, no data that causes a disabled function to be executed can enter during a call. In a mode in which no element is displayed, no input is allowed. Thus, this mode is equivalent to limiting an input.

[Notification]

Figure 18:
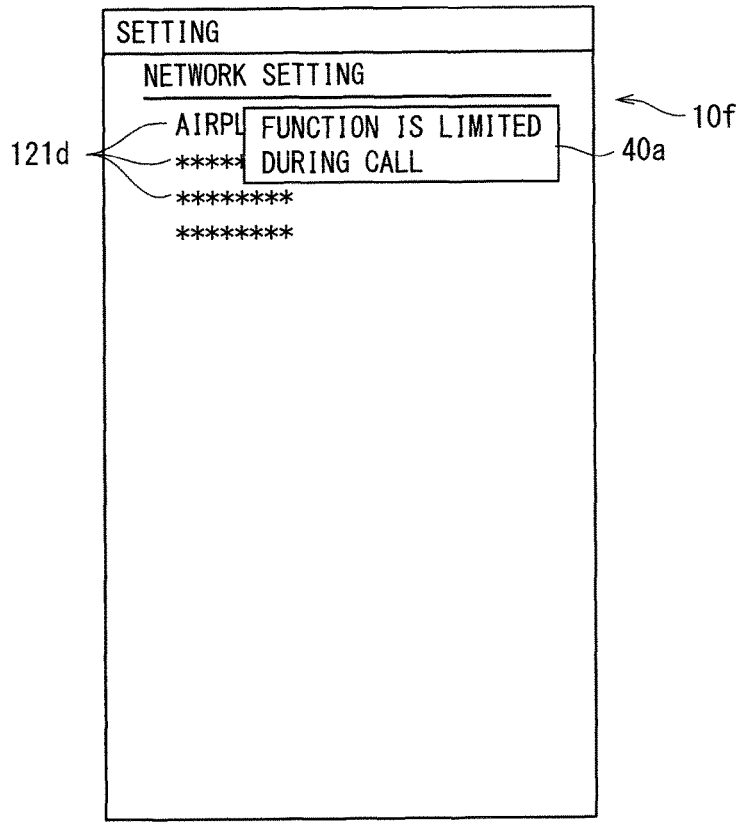
FIG. 18 schematically illustrates an example of a menu screen.

With an input to any one of the various functions that have been limited during a call, the notifier 40 may notify the user that the limiting is being performed. For example, when the user operates an element of the function through the touch panel 52, the function processor 120 causes the display 41 to display information indicating execution of the limiting, or the first sound output unit 42 or the second sound output unit 44 to output sound that provides the information. Alternatively, the function processor 120 may cause the vibrator 45 to vibrate. When the function processor 120 causes the display 41 to display the information indicating execution of the limiting, the information may be displayed in text or as a graphic symbol. Furthermore, the function processor 120 may cause the display 41 to display that the user is on a call to indirectly notify the execution of the limiting. FIG. 18 schematically illustrates an example of the menu screen 10f. In the example of FIG. 18, notification content 40a is displayed. This notification content 40a is displayed in text as, for example, "FUNCTION IS LIMITED DURING CALL".

Accordingly, the user can know that the function is being limited.

[Limiting Input]

In the above examples, a function involving termination of communication via a network is limited. Thus, an input that executes the function may be limited. For example, the limiting processor 130 may reduce the sensitivity of an input that executes the function (hereinafter may be referred to as "input sensitivity") as the limiting. The input sensitivity represents ease with which an operation by the user is determined as an input to the electronic apparatus 100. For example, when the capacitive touch panel 52 is used, if change in the capacitance is greater than the reference capacitance value, the operation is determined as an input to the electronic apparatus 100. When this reference capacitance value is set smaller, slight change in the capacitance allows detection of the input. When this reference capacitance value is set greater, unless the capacitance greatly changes, the input cannot be detected. In other words, this reference capacitance value is an example of a parameter indicating an input sensitivity. Smaller the reference capacitance value is, the higher the input sensitivity is.

Furthermore, time is sometimes used as a condition for detecting an input. For example, when a change in capacitance exceeding the reference capacitance value is maintained for a longer time than the time reference value, the operation is determined as an input. Thus, even when the time for bringing an operator closer to the touch panel 52 is shorter, the operation is determined as an input with a smaller time reference value. Here, the time reference value can be regarded as an example of the input sensitivity. Thus, smaller the time reference value is, the higher the input sensitivity is.

The limiting processor 130 sets an input sensitivity of the function involving termination of communication via a network used in a call when the call processor 110 processes the call lower than an input sensitivity of the same function when the call processor 110 does not process the call. For example, during a voice call, the limiting processor 130 sets lower the input sensitivity of the setting indicating change in the SIM card. The same holds true for the other settings.

Figure 19:
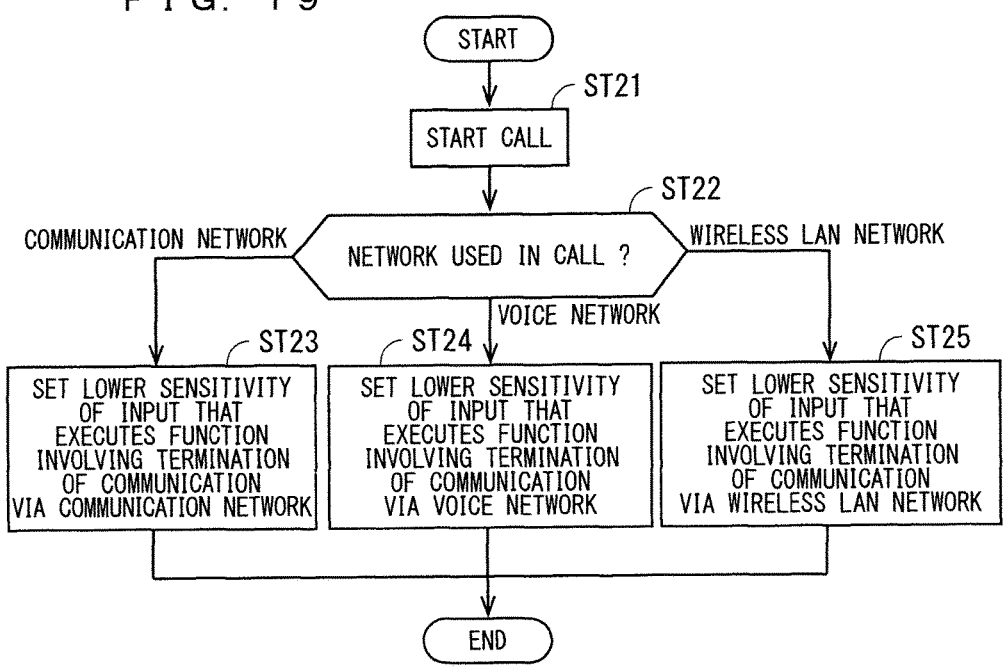
FIG. 19 schematically illustrates a flowchart showing an example of operations performed by the controller.

FIG. 19 illustrates a flowchart showing an example of operations performed by the controller 10. Steps ST21 and ST22 are identical to the steps ST1 and ST2, respectively. Steps ST23 to ST25 are identical to the steps ST3 to ST5, respectively except for an object to be limited is an input and the limiting is reduction in the input sensitivity. Specifically, when a communication network is used, the limiting processor 130 sets lower the sensitivity of an input that executes a function involving termination of communication via the communication network at the step ST23. Furthermore, when a voice network is used, the limiting processor 130 sets lower the sensitivity of an input that executes a function involving termination of communication via the voice network at the step ST24. When a wireless LAN network is used, the limiting processor 130 sets lower the sensitivity of an input that executes a function involving termination of communication via the wireless LAN network at the step ST25.

Accordingly, during a call, even when the user performs an operating error that executes a function involving termination of communication via a network used in the call, this operating error is less likely to be determined as an input. Thus, the operating error is less likely to cause disconnection of a network. In other words, a call is easily maintained.

Furthermore, an input is not disabled even when the input sensitivity becomes lower. Thus, if the user determines that a function corresponding to the input should be executed even with the call interrupted, the function can be executed.

[Reflecting Change in Various Functions]

In the above examples, at least one of a function involving termination of communication via a network used in a call and the input indicating the function is limited during the call. The timing of executing the function will be described hereinafter. Specifically, when the user enters data that causes a limited function to be executed during a call, the operation setting device 121 may execute the function after the call.

FIG. 20 illustrates a flowchart showing an example of operations performed by the controller 10. Since steps ST1 to ST5 are identical to the steps ST1 to ST5 in FIG. 14, respectively, the description will not be repeated. At a step ST6 after the steps ST3 to ST5, the operation setting device 121 determines whether the user operates an element corresponding to a limited function. The determination can be made based on information from the touch panel 52. If YES is selected at the step ST6, the operation setting device 121 stores operation information in the storage 103 at a step ST7. The operation information is information indicating presence of an operation for the limited function, and includes information which function has been operated.

At a step ST8 after NO is selected at the step ST6 or through the step ST7, the operation setting device 121 determines whether the call ends. The call processor 110 notifies the operation setting device 121 of the end of the call. When the operation setting device 121 determines that the call has not ended yet, the step ST6 is again performed. When determining that the call ends, the operation setting device 121 determines whether the operation information is stored in the storage 103 at a step ST9. In other words, the operation setting device 121 determines whether the element corresponding to the function is operated during the call. When determining that the operation information is not stored, the operation ends. In other words, since the element corresponding to the function is not operated during the call, the operation ends without executing the function. When determining that the operation information is stored, the operation setting device 121 executes the function corresponding to the stored operation information at a step ST10.

For example, when the user operates an element corresponding to turning ON or OFF a wireless LAN during a wireless LAN call, YES is selected at the step ST6. Accordingly, the operation information corresponding to the function is stored (step ST7). When the user ends the call, YES is selected at the steps ST8 and ST9. Accordingly, the operation setting device 121 turns OFF the wireless LAN (step ST10). Thus, the user does not have to operate the element of the function again after the call. Thus, the convenience can be improved. Since turning OFF the wireless LAN can stop supplying power to the various functional units necessary for communication via the wireless LAN, the power consumption can be reduced.

Figure 21:
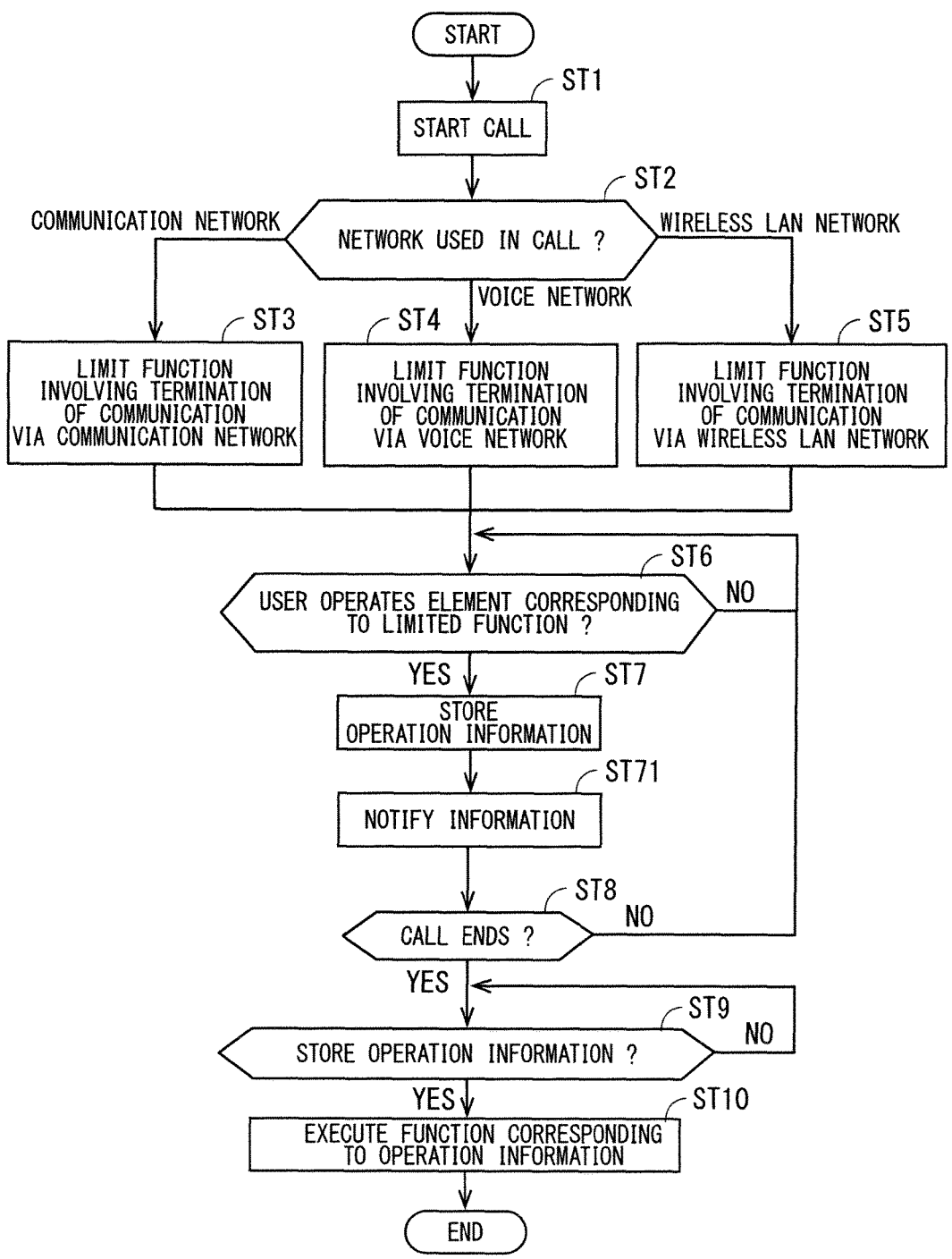
FIG. 21 schematically illustrates a flowchart showing an example of operations performed by the controller.

Furthermore, when an element corresponding to a function is operated during a call, the operation setting device 121 may notify the user that the function is to be executed after the call. As illustrated in FIG. 21, for example, when determining at the step ST6 that an element corresponding to a function to be limited has been operated, the operation setting device 121 may perform a step ST71. In FIG. 21, the step ST71 is performed, for example, after the step ST7. At the step ST71, the operation setting device 121 causes the notifier 40 to notify information. For example, the operation setting device 121 causes the display 41 to display information indicating that the function is to be executed after the call. Accordingly, the user can know during a call that the element of the function operated during the call is to be executed after the call.

Figure 22:
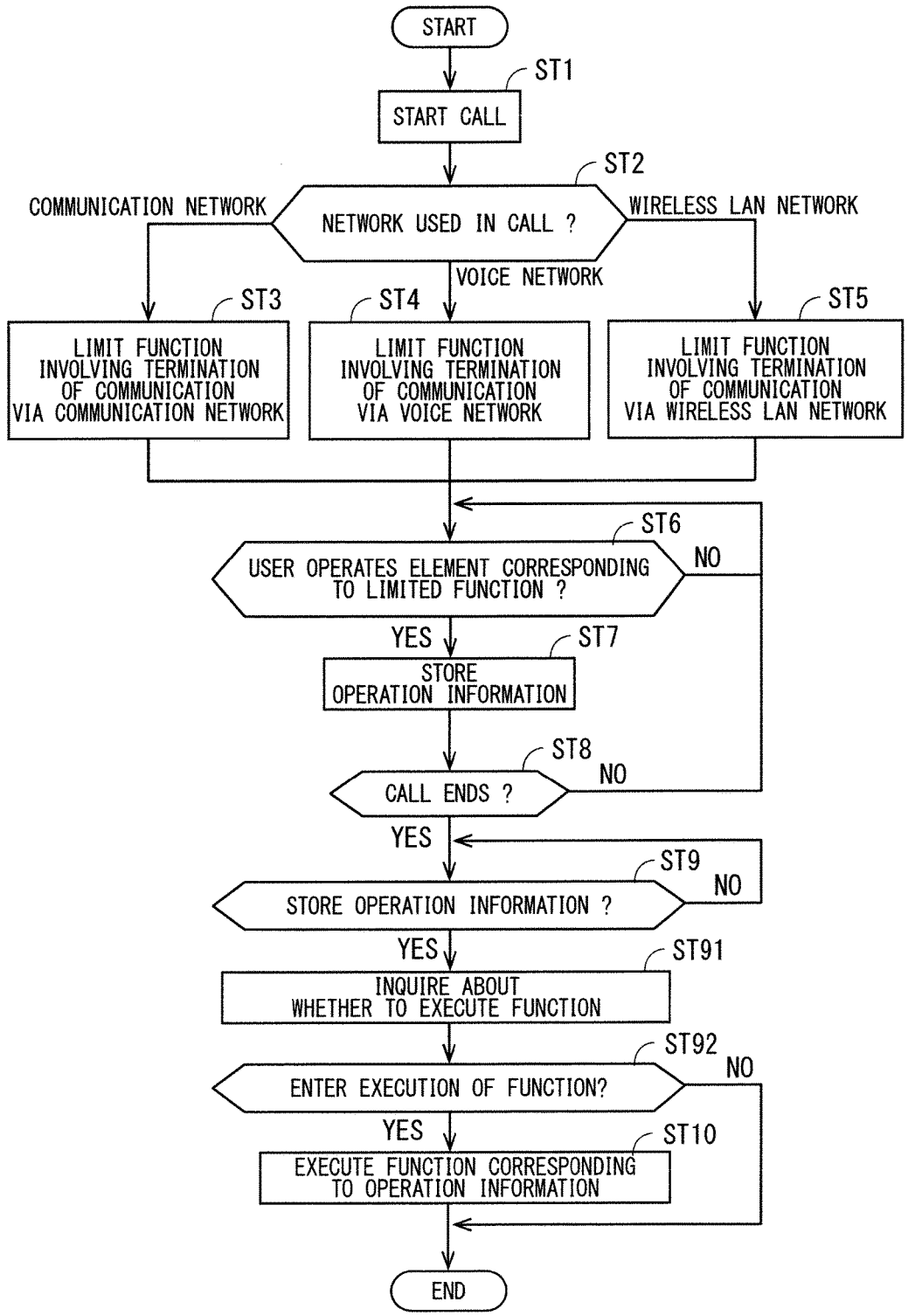
FIG. 22 schematically illustrates a flowchart showing an example of operations performed by the controller.

Furthermore, the user may be inquired about whether to execute the function after the call. As illustrated in FIG. 22, for example, when determining at a step ST9 that the operation information is stored, the operation setting device 121 may inquire of the user about whether to execute the function at a step ST91. For example, the operation setting device 121 causes the display 41 to display a type of a function operated during a call and an inquiry about whether to execute the function. This display should include an element (button) for entering whether to execute a function.

Next at a step ST92, the operation setting device 121 determines whether the user has entered execution of a function. This determination can be made based on information from the touch panel 52. When determining the presence of the input for executing the function, the operation setting device 121 executes the function at a step ST10. When determining the presence of the input indicating that execution of the function to be unnecessary, the operation setting device 121 stops the operation without executing the step ST10.

Accordingly, the user does not have to perform an operation of calling a menu screen for executing the function. Thus, the convenience can be improved. Furthermore, when the execution of the function is unnecessary, the user can enter data indicating no execution of the function.

Although three types of the networks are used in the above examples, more than two types of the networks will do. In other words, the function processor 120 and the limiting processor 130 have only to do the following operations: (a) the function processor 120 executes (i) a first function of terminating communication via a first network, in response to a first input to the input unit 50, (ii) a second function of terminating communication via a second network, in response to a second input to the input unit 50, and (iii) a third function of terminating communication via the first and second networks, in response to a third input to the input unit 50; and (b) the limiting processor 130 limits, when a call processor processes a first call, at least one of the first input and the first function and at least one of the third input and the third function, and limits, when the call processor processes a second call, at least one of the second input and the second function and at least one of the third input and the third function. Accordingly, during a call, the possibility of disconnecting a network used in the call can be reduced.

Although the call processor 111 processes a voice call and a communication call in the above examples, it may process only one of them. In such a case, a call processor that executes the other of the voice call and the communication call may be installed as an application separate from the call processor 111. Alternatively, while the call processor 111 processes both a voice call and a communication call, a call processor that executes only one of the voice call and the communication call may be installed as another application separate from the call processor 111.

Although the various functions terminate communication via a network as described above, the call may be maintained using another network. For example, when a function of terminating communication via a voice network is executed during a voice call, the call processor 111 may switch from the voice call to a communication call to allow the user to communicate. Here, the base stations 210 and the servers 220 also appropriately switch a network for transmitting and receiving a signal.

As such, when the electronic apparatus 100 can communicate switchably via networks, the limiting may be performed as follows. Specifically, when the electronic apparatus 100 can communicate with networks, the limiting processor 130 does not perform the limiting. In the presence of a single communicable network, the limiting processor

130 may limit at least one of a function of terminating communication via the network and an input triggering the function.

For example, when both a voice call and a communication call are possible, the limiting is not performed. This is because even when communication via one of the voice network and the communication network is terminated, the call can be maintained by communication via the other one of the voice network and the communication network. For example, when the electronic apparatus 100 communicates with the base station 210 that complies with only 3G, only a voice call is possible. Thus, during a voice call, terminating communication via a voice network should be limited. Accordingly, the call can be easily maintained by reducing the possibility of terminating communication via the voice network.

Although an electronic apparatus is described in detail above, the electronic apparatus is not limited by these but exemplified in all aspects. It is therefore understood that numerous modifications that have not yet been exemplified can be devised without departing from the scope of the disclosure.

The embodiments can be combined with each other as long as they are not contradictory.

The invention claimed is:

1. An electronic apparatus, comprising:
a communication unit configured to communicate with a plurality of networks;
an input unit; and
at least one processor configured to:
process, through the communication unit, a first call via a first network and a second call via a second network different from the first network, the first network and the second network being included in the plurality of networks;
execute (i) a first function of terminating communication via the first network, in response to a first input to the input unit, (ii) a second function of terminating communication via the second network, in response to a second input to the input unit, and (iii) a third function of terminating communication via the first and second networks, in response to a third input to the input unit; and
limit, when the at least one processor processes the first call, at least one of the first input and the first function and at least one of the third input and the third function, and limit, when the at least one processor processes the second call, at least one of the second input and the second function and at least one of the third input and the third function.

2. The electronic apparatus according to claim 1, wherein the at least one processor disables, as the limiting, (i) the first and third functions when the at least one processor processes the first call, and (ii) the second and third functions when the at least one processor processes the second call.

3. The electronic apparatus according to claim 1,
wherein the input unit includes a display and a touch panel,
the at least one processor causes the display to display a screen in response to a fourth input to the input unit, the screen including first to third elements functioning as buttons corresponding the first to third inputs, respectively, and performs the limiting in response to the fourth input.

4. The electronic apparatus according to claim 2,
wherein the input unit includes a display and a touch panel, and
the at least one processor causes the display to display:
first to third elements functioning as buttons corresponding the first to third inputs, respectively, in a first display mode, when the at least one processor does not process the first or second call;
the first and third elements in a second display mode different from the first display mode, when the at least one processor processes the first call; and
the second and third elements in the second display mode, when the at least one processor processes the second call.

5. The electronic apparatus according to claim 2,
wherein the input unit includes a display and a touch panel, and
the at least one processor:
causes the display to display first to third elements functioning as buttons corresponding the first to third inputs, respectively, when the at least one processor does not process the first or second call;
does not cause the display to display the first or third element when the at least one processor processes the first call; and
does not cause the display to display the second or third element when the at least one processor processes the second call.

6. The electronic apparatus according to claim 1, further comprising
a notifier configured to notify the limiting in response to at least one of the first and third inputs when the at least one processor processes the first call, or in response to at least one of the second and third inputs when the at least one processor processes the second call.

7. The electronic apparatus according to claim 1,
wherein the at least one processor sets, as the limiting, (i) an input sensitivity to the first and third inputs when the at least one processor processes the first call lower than an input sensitivity to the first and third inputs when the at least one processor does not process the first or second call, and (ii) an input sensitivity to the second and third inputs when the at least one processor processes the second call lower than an input sensitivity to the second and third inputs when the at least one processor does not process the first or second call.

8. The electronic apparatus according to claim 1,
wherein (i) in response to the first input during the first call, the at least one processor executes the first function, (ii) in response to the third input during the first call, the at least one processor executes the third function after the first call, (iii) in response to the second input during the second call, the at least one processor executes the second function after the second call, and (iv) in response to the third input during the second call, the at least one processor executes the third function after the second call.

9. The electronic apparatus according to claim 8, further comprising
a notifier configured to (i) in response to the first input during the first call, notify that the at least one processor executes the first function after the first call, (ii) in response to the third input during the first call, notify that the at least one processor executes the third function after the first call, (iii) in response to the second input during the second call, notify that the at least one processor executes the second function after the second call, and (iv) in response to the third input during the second call, notify that the at least one processor executes the third function after the second call.

10. The electronic apparatus according to claim 8,
wherein (i) in response to the first input during the first call, the at least one processor inquires of a user, after the first call, about whether to execute the first function, (ii) in response to the third input during the first call, the at least one processor inquires of the user, after the first call, about whether to execute the third function, (iii) in response to the second input during the second call, the at least one processor inquires of the user, after the second call, about whether to execute the second function, and (iv) in response to the third input during the second call, the at least one processor inquires of the user, after the second call, about whether to execute the third function.

11. A method for controlling an electronic apparatus, the method comprising:
  processing, through a communication unit that communicates with a plurality of networks, a first call via a first network and a second call via a second network different from the first network, the first network and the second network being included in the plurality of networks;
  executing (i) a first function of terminating communication via the first network, in response to a first input to an input unit, (ii) a second function of terminating communication via the second network, in response to a second input to the input unit, and (iii) a third function of terminating communication via the first and second networks, in response to a third input to the input unit; and
  limiting, in processing the first call, at least one of the first input and the first function and at least one of the third input and the third function, and limiting, in processing the second call, at least one of the second input and the second function and at least one of the third input and the third function.

12. A processor for an electronic apparatus including a communication unit that communicates with a plurality of networks, and an input unit, the processor comprising:
  a call processor that processes, through the communication unit, a first call via a first network and a second call via a second network different from the first network, the first network and the second network being included in the plurality of networks;
  a function processor that executes (i) a first function of terminating communication via the first network, in response to a first input to the input unit, (ii) a second function of terminating communication via the second network, in response to a second input to the input unit, and (iii) a third function of terminating communication via the first and second networks, in response to a third input to the input unit; and
  a limiting processor that limits, when the call processor processes the first call, at least one of the first input and the first function and at least one of the third input and the third function, and limits, when the call processor processes the second call, at least one of the second input and the second function and at least one of the third input and the third function.

* * * * *